US009398108B2

(12) United States Patent
Smith et al.

(10) Patent No.: US 9,398,108 B2
(45) Date of Patent: *Jul. 19, 2016

(54) INTELLIGENT DELIVERY AGENT FOR SHORT MESSAGE DISTRIBUTION CENTER

(71) Applicant: TeleCommunication Systems, Inc., Annapolis, MD (US)

(72) Inventors: Richard A. Smith, Annapolis, MD (US); Michael Dewey, Arnold, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,407

(22) Filed: Sep. 3, 2015

(65) Prior Publication Data
US 2016/0057242 A1 Feb. 25, 2016

Related U.S. Application Data

(63) Continuation of application No. 14/314,675, filed on Jun. 25, 2014, now Pat. No. 9,143,908, which is a continuation of application No. 13/356,735, filed on Jan. 24, 2012, now Pat. No. 8,542,660, which is a
(Continued)

(51) Int. Cl.
*H04W 4/00* (2009.01)
*H04L 29/08* (2006.01)
(Continued)

(52) U.S. Cl.
CPC .......... *H04L 67/28* (2013.01); *H04L 12/5895* (2013.01); *H04L 51/14* (2013.01); *H04L 51/38* (2013.01); *H04L 67/24* (2013.01); *H04M 3/42382* (2013.01); *H04M 3/4872* (2013.01); *H04M 3/533* (2013.01);
(Continued)

(58) Field of Classification Search
CPC .................................. H04W 4/12; H04W 4/14
USPC ........................................................ 370/338
See application file for complete search history.

(56) References Cited

U.S. PATENT DOCUMENTS 5,410,598 A   4/1995 Shear
5,628,051 A   5/1997 Salin
(Continued)

OTHER PUBLICATIONS $3^{rd}$ Generation Partnership Project, 3G TS 23.040 V3.4.0 (Mar. 2000)-Technical Specification; Technical Specification Group Terminals; Technical Realization of the Short Message Service (SMS) Last Modified Mar. 30, 2000, pp. 1-125.
$3^{rd}$ Generation Partnership Project, 3G TS 23.040 V3.10.0 (Jun. 2003)-Technical Specification; Technical Specification Group Terminals; Technical Realization of the Short Message Service (SMS), Last Modified Jun. 25, 2003, pp. 1-126.
(Continued)

Primary Examiner — Farah Faroul
(74) Attorney, Agent, or Firm — Tarolli, Sundheim, Covell & Tummino LLP

(57) ABSTRACT

A message distribution center (MDC) and Intelligent Delivery Agent are implemented in a wireless Internet gateway interposed between content providers and a wireless carrier to subjectively examine and direct messages via SMTP based on desired rules (non-peak hours, paying subscribers only, etc.) using standard SMTP Gateway and other well-known protocols. The MDC includes an individual queue for each subscriber, and the provider is informed through conventional SMTP protocol messages that the short message has been accepted. If the carrier has specifically disallowed service for a particular MIN (in the case of churning), then the content provider is informed through an SMTP interchange that the recipient is invalid.

18 Claims, 18 Drawing Sheets

Related U.S. Application Data continuation of application No. 12/926,857, filed on Dec. 14, 2010, now Pat. No. 8,787,335, which is a continuation of application No. 11/025,902, filed on Jan. 3, 2005, now Pat. No. 7,860,068, which is a continuation of application No. 09/832,012, filed on Apr. 11, 2001, now Pat. No. 6,839,562.

(60) Provisional application No. 60/196,101, filed on Apr. 11, 2000, provisional application No. 60/196,097, filed on Apr. 11, 2000.

(51) Int. Cl.
| | |
|---|---|
| *H04M 3/42* | (2006.01) |
| *H04M 3/487* | (2006.01) |
| *H04M 3/533* | (2006.01) |
| *H04W 4/14* | (2009.01) |
| *H04W 88/18* | (2009.01) |
| *H04W 8/00* | (2009.01) |
| *H04L 12/58* | (2006.01) |
| *H04M 3/53* | (2006.01) |
| *H04M 7/12* | (2006.01) |
| *H04W 4/12* | (2009.01) |

(52) U.S. Cl.
CPC .......... *H04M 3/53316* (2013.01); *H04W 4/14* (2013.01); *H04W 8/005* (2013.01); *H04W 88/184* (2013.01); *H04L 12/5855* (2013.01); *H04M 3/5322* (2013.01); *H04M 7/12* (2013.01); *H04M 2203/205* (2013.01); *H04M 2203/2016* (2013.01); *H04M 2207/18* (2013.01); *H04W 4/12* (2013.01)

(56) References Cited

U.S. PATENT DOCUMENTS

| | | | |
|---|---|---|---|
| 5,682,600 A | 10/1997 | Salin | |
| 5,719,918 A | 2/1998 | Serbetciouglu | |
| 5,856,974 A | 1/1999 | Gervais | |
| 5,907,805 A * | 5/1999 | Chotai | H04M 3/42 379/209.01 |
| 5,941,945 A | 8/1999 | Aditham | |
| 5,959,543 A | 9/1999 | LaPorta | |
| 5,963,864 A | 10/1999 | O'Neil | |
| 6,131,024 A | 10/2000 | Boltz | |
| 6,134,432 A | 10/2000 | Holmes | |
| 6,138,158 A * | 10/2000 | Boyle | H04L 67/02 709/206 |
| 6,175,922 B1 | 1/2001 | Wang | |
| 6,208,870 B1 | 3/2001 | Lorello | |
| 6,244,758 B1 | 6/2001 | Solymar | |
| 6,263,212 B1 | 7/2001 | Ross | |
| 6,301,695 B1 | 10/2001 | Burnham | |
| 6,314,108 B1 | 11/2001 | Ramasubramani | |
| 6,393,014 B1 | 5/2002 | Daly | |
| 6,421,707 B1 | 7/2002 | Miller | |
| 6,421,733 B1 | 7/2002 | Tso | |
| 6,424,841 B1 | 7/2002 | Gustafsson | |
| 6,430,540 B1 | 8/2002 | Guidice | |
| 6,446,112 B1 | 9/2002 | Bunney | |
| 6,446,969 B1 | 9/2002 | Denoual | |
| 6,456,852 B2 | 9/2002 | Bar | |
| 6,459,892 B2 | 10/2002 | Burgan | |
| 6,470,181 B1 * | 10/2002 | Maxwell | H04L 12/589 379/67.1 |
| 6,487,180 B1 | 11/2002 | Borgstahl | |
| 6,493,430 B2 | 12/2002 | Leuca | |
| 6,512,930 B2 | 1/2003 | Sandegren | |
| 6,567,979 B1 | 5/2003 | deCarmo | |
| 6,625,461 B1 | 9/2003 | Bertacchi | |
| 6,654,786 B1 | 11/2003 | Fox | |
| 6,674,767 B1 | 1/2004 | Kadyk | |
| 6,771,971 B2 | 8/2004 | Smith | |
| 6,826,597 B1 | 11/2004 | Lonroth | |
| 6,850,916 B1 | 2/2005 | Wang | |
| 6,886,017 B1 * | 4/2005 | Jackson | G06F 8/60 |
| 6,993,325 B1 | 1/2006 | Waesterlid | |
| 7,003,282 B1 * | 2/2006 | Ekberg | H04W 12/06 380/270 |
| 7,010,303 B2 | 3/2006 | Lewis | |
| 7,039,037 B2 | 5/2006 | Wang | |
| 7,058,036 B1 | 6/2006 | Yu | |
| 7,069,439 B1 | 6/2006 | Chen | |
| 7,171,190 B2 | 1/2007 | Ye | |
| 7,197,661 B1 | 3/2007 | Reynolds | |
| 7,224,696 B2 | 5/2007 | Bouleros | |
| 7,260,836 B2 | 8/2007 | Roskind | |
| 7,409,428 B1 | 8/2008 | Brabec | |
| 7,480,915 B2 | 1/2009 | Costa Requena | |
| 7,486,641 B2 | 2/2009 | Reddy | |
| 7,509,136 B2 | 3/2009 | Hart | |
| 7,519,654 B1 | 4/2009 | Smith | |
| 7,577,431 B2 | 8/2009 | Jiang | |
| 7,627,305 B2 | 12/2009 | Helferich | |
| 2001/0034224 A1 | 10/2001 | McDowell | |
| 2002/0143946 A1 | 10/2002 | Crosson | |
| 2003/0040300 A1 | 2/2003 | Bodic | |
| 2003/0092454 A1 | 5/2003 | Halim | |
| 2003/0105864 A1 | 6/2003 | Mulligan | |
| 2003/0163730 A1 | 8/2003 | Roskind | |
| 2003/0193967 A1 | 10/2003 | Fenton | |
| 2004/0148357 A1 | 7/2004 | Corrigan | |
| 2004/0196858 A1 | 10/2004 | Tsai | |
| 2004/0203756 A1 | 10/2004 | Lin | |
| 2005/0004968 A1 | 1/2005 | Mononen | |
| 2005/0064884 A1 | 3/2005 | Dumont | |
| 2005/0076084 A1 | 4/2005 | Loughmiller et al. | |
| 2005/0132060 A1 | 6/2005 | Mo | |
| 2005/0141522 A1 | 6/2005 | Kadar | |
| 2005/0164721 A1 | 7/2005 | Yeh | |
| 2005/0176409 A1 | 8/2005 | Carpenter | |
| 2006/0194595 A1 | 8/2006 | Myllynen | |
| 2008/0014907 A1 * | 1/2008 | Chun | H04M 3/42 455/414.1 |
| 2009/0221310 A1 * | 9/2009 | Chen | H04L 12/5835 455/466 |
| 2010/0257241 A1 | 10/2010 | Hale | |
| 2011/0230212 A1 * | 9/2011 | Cai | H04W 68/00 455/466 |
| 2011/0263247 A1 * | 10/2011 | Smelov | H04W 4/021 455/432.1 |
| 2011/0319075 A1 * | 12/2011 | Sharma | H04W 4/14 455/432.2 |
| 2013/0339454 A1 * | 12/2013 | Walker | H04L 51/04 709/206 |

OTHER PUBLICATIONS

3rd Generation Partnership Project, 3G TS 23.040 V3.4.0 (Mar. 2000)-Technical Specification; Technical Specification Group Terminals; Technical Realization of the Short Message Service (SMS); Point-to-Point (PP), Last Modified Mar. 30, 2000, pp. 1-125.

3rd Generation Partnership Project, 3G TS 23.040 V3.1.0 (Jul. 1999)-Technical Specification; Technical Specification Group Terminals; Technical Realization of the Short Message Service (SMS); Point-to-Point (PP), Last Modified Mar. 30, 2000, pp. 1-117.

3rd Generation Partnership Project, 3G TS 23.040 V3.2.0 (Oct. 1999)-Technical Specification; Technical Specification Group Terminals; Technical Realization of the Short Message Service (SMS); Point-to-Point (PP), Last Modified Mar. 30, 2000, pp. 1-118.

3rd Generation Partnership Project, 3G TS 23.040 V3.3.0 (Dec. 1999)-Technical Specification; Technical Specification Group Terminals; Technical Realization of the Short Message Service (SMS), 1999 Release, pp. 1-118.

3rd Generation Partnership Project, 3G TS 23.040 V3.4.1 (Apr. 2000)-Technical Specification; Technical Specification Group Terminals; Technical Realization of the Short Message Service (SMS);, Release 1999, pp. 1-125.

3rd Generation Partnership Project, 3G TS 23.040 V3.5.0 (Jul. 2000)-Technical Specification; Technical Specification Group Terminals; Technical Realization of the Short Message Service (SMS);, Release 1999, pp. 1-126.

(56) References Cited

OTHER PUBLICATIONS

3rd Generation Partnership Project, 3G TS 23.040 V3.6.0 (Sep. 2001)-Technical Specification; Technical Specification Group Terminals; Technical Realization of the Short Message Service (SMS);, Release 1999, pp. 1- 126.
3rd Generation Partnership Project, 3G TS 23.040 V3.7.0 (Dec. 2001)-Technical Specification; Technical Specification Group Terminals; Technical Realization of the Short Message Service (SMS);, Release 1999, pp. 1- 126.
3rd Generation Partnership Project, 3G TS 23.040 V3.8.0 (Mar. 2002)-Technical Specification; Technical Specification Group Terminals; Technical Realization of the Short Message Service (SMS); Release 1999, pp. 1- 126.
3rd Generation Partnership Project, 3G TS 23.040 V3.9.0 (Jun. 2002)-Technical Specification; Technical Specification Group Terminals; Technical Realization of the Short Message Service (SMS); Release 1999, pp. 1- 126.
3rd Generation Partnership Project, 3G TS 23.040 V4.0.0 (Jul. 2000)-Technical Specification; Technical Specification Group Terminals; Technical Realization of the Short Message Service (SMS); Release 2000, pp. 1- 126.
3rd Generation Partnership Project, 3G TS 23.040 V4.1.0 (Oct. 2002)-Technical Specification; Technical Specification Group Terminals; Technical Realization of the Short Message Service (SMS); Release 4, 2001, pp. 1-126.
3rd Generation Partnership Project, 3G TS 23.040 V4.2.0 (Mar. 2001)-Technical Specification; Technical Specification Group Terminals; Technical Realization of the Short Message Service (SMS); Release 4, 2001, pp. 1-126.
3rd Generation Partnership Project, 3G TS 23.040 V4.3.0 (Jun. 2001)-Technical Specification; Technical Specification Group Terminals; Technical Realization of the Short Message Service (SMS); Release 4, 2001, pp. 1-126.
3rd Generation Partnership Project, 3G TS 23.040 V4.4.0 (Sep. 2001)-Technical Specification; Technical Specification Group Terminals; Technical Realization of the Short Message Service (SMS); Release 4, 2001, pp. 1-128.
3rd Generation Partnership Project, 3G TS 23.040 V4.5.0 (Dec. 2001)-Technical Specification; Technical Specification Group Terminals; Technical Realization of the Short Message Service (SMS); Release 4, 2002, pp. 1-128.
3rd Generation Partnership Project, 3G TS 23.040 V4.6.0 (Dec. 2001)-Technical Specification; Technical Specification Group Terminals; Technical Realization of the Short Message Service (SMS); Release 4, 2002, pp. 1-128.
3rd Generation Partnership Project, 3G TS 23.040 V4.7.0 (Jun. 2002)-Technical Specification; Technical Specification Group Terminals; Technical Realization of the Short Message Service (SMS); Release 4, 2002, pp. 1-128.
3rd Generation Partnership Project, 3G TS 23.040 V4.8.0 (Jun. 2003)-Technical Specification; Technical Specification Group Terminals; Technical Realization of the Short Message Service (SMS); Release 4, 2003, pp. 1-128.
3rd Generation Partnership Project, 3G TS 23.040 V5.0.0 (Jun. 2001)-Technical Specification; Technical Specification Group Terminals; Technical Realization of the Short Message Service (SMS); Release 5, 2001, pp. 1-137.
3rd Generation Partnership Project, 3G TS 23.040 V5.1.0 (Sep. 2001)-Technical Specification; Technical Specification Group Terminals; Technical Realization of the Short Message Service (SMS); Release 5, 2001, pp. 1-137.
3rd Generation Partnership Project, 3G TS 23.040 V5.2.0 (Dec. 2001)-Technical Specification; Technical Specification Group Terminals; Technical Realization of the Short Message Service (SMS); Release 5, 2002, pp. 1-143.
3rd Generation Partnership Project, 3G TS 23.040 V5.3.0 (Mar. 2002)-Technical Specification; Technical Specification Group Terminals; Technical Realization of the Short Message Service (SMS); Release 5, 2002, pp. 1-178.
3rd Generation Partnership Project, 3G TS 23.040 V5.4.0 (Jun. 2002)-Technical Specification; Technical Specification Group Terminals; Technical Realization of the Short Message Service (SMS); Release 5, 2002, pp. 1-181.
3rd Generation Partnership Project, 3G TS 23.040 V5.5.0 (Sep. 2002)-Technical Specification; Technical Specification Group Terminals; Technical Realization of the Short Message Service (SMS); Release 5, 2002, pp. 1-181.
3rd Generation Partnership Project, 3G TS 23.040 V5.5.1 (Sep. 2002)-Technical Specification; Technical Specification Group Terminals; Technical Realization of the Short Message Service (SMS); Release 5, 2002, pp. 1-181.
3rd Generation Partnership Project, 3G TS 23.040 V5.6.0 (Jun. 2003)-Technical Specification; Technical Specification Group Terminals; Technical Realization of the Short Message Service (SMS); Release 5, 2003, pp. 1-181.
3rd Generation Partnership Project, 3G TS 23.040 V5.6.1 (Jun. 2003)-Technical Specification; Technical Specification Group Terminals; Technical Realization of the Short Message Service (SMS); Release 5, 2003, pp. 1-181.
3rd Generation Partnership Project, 3G TS 23.040 V6.0.0 (Sep. 2002)-Technical Specification; Technical Specification Group Terminals; Technical Realization of the Short Message Service (SMS); Release 6, 2002, pp. 1-182.
3rd Generation Partnership Project, 3G TS 23.040 V6.0.1 (Sep. 2002)-Technical Specification; Technical Specification Group Terminals; Technical Realization of the Short Message Service (SMS); Release 6, 2002, pp. 1-182.
3rd Generation Partnership Project, 3G TS 23.040 V6.1.0 (Jun. 2003)-Technical Specification; Technical Specification Group Terminals; Technical Realization of the Short Message Service (SMS); Release 6, 2003, pp. 1-182.
3rd Generation Partnership Project, 3G TS 23.040 V6.2.0 (Jun. 2003)-Technical Specification; Technical Specification Group Terminals; Technical Realization of the Short Message Service (SMS); Release 6, 2003, pp. 1-182.
3rd Generation Partnership Project, ETSI TS 123 040 V4.2.0 (2001-2003),Technical Specification; Universal Mobile Telecommunications System (UMTS); Technical Realization of the Short Message Service (SMS), (3Gpp TS 23.040 version 4.2.0 Release 4), pp. 1-127.
3rd Generation Partnership Project, ETSI TS 123 040 V3.3.0 (Jan. 2000), Technical Specification; Universal Mobile Telecommunications System (UMTS); Technical Realization of the Short Message Service (SMS), (3G TS 23.040 version 3.3.0 Release 1999), pp. 1-117.
3rd Generation Partnership Project, ETSI TS 100-901 V7.5.0 (Dec. 2001), Technical Specification; Digital Cellular Telecommunications System (Phase 2+); Technical Realization of the Short Message Service (SMS) point-to-Point (PP), (3Gpp TS 03.40 version 7.5.0 Release 1998), pp. 1-119.
3rd Generation Partnership Project, ETSI TS 123 040 V3.5.0 (Jul. 2000), Technical Specification; Universal Mobile Telecommunications System (UMTS); Technical Realization of the Short Message Service (SMS) (3G TS 23.040 version 3..5.0 Release 1999), pp. 1-127.
3rd Generation Partnership Project, ETSI TS 123 040 V4.3.0 (Jun. 2001), Technical Specification; Digital Cellular Telecommunications system (Phase 2+)(GSM); Universal Mobile Telecommunications System (UMTS); Technical Realization of the Short Message Service (SMS) (3GPP TS 23.040 version 4.3.0 Release 4), pp. 1-127.
Java-Centric Distributed Computing by Wollrath, A et al..; IEEE, vol. 17 Issue 3, May-Jun. 1997, pp. 44-53.
Appendix A, "Short Message Peer to Peer (SMPP) Interface Specification," 09588460, Jun. 6, 2000.

* cited by examiner

MAST Architecture and Information Flow

*FIG. 8B*
(PRIOR ART)

| RegistrationNotification INVOKE Parameters ||
|---|---|
| Field | Value |
| Identifier | SET [NATIONAL18] |
| Length | variable octets |
| Contents ||
| ElectronicSerialNumber ||
| MobileIdentificationNumber ||
| MSCID (Serving MSC) ||
| QualificationInformationCode ||
| SystemMyTypeCode (Serving MSC or VLR) ||
| AvailabilityType ||
| BorderCellAccess ||
| ControlChannelData ExtendedMSCID (VLR) ||
| LocationAreaID ||
| PC_SSN (Serving MSC or VLR) ||
| ReceivedSignalQuality ||
| ReportType ||
| SenderidentificationNumber ||
| SMS_Address ||
| SMS_MessageWaitingindicator ||
| SystemAccessData ||
| SystemAccessType ||
| SystemCapabilities ||
| TerminalType ||
| TransactionCapability ||

RegistrationNotification INVOKE Parameters

FIG. 9A

Mobile Subscriber Inactive

Shut Down
Alert

STANDARD SS7 MESSAGE
(IS-41)

FIG. 9B

MSInactive

| This operation was named CSSInactive prior to this revision of the Interim Standard. |

The MSInactive operation is used to indicate that an MS is inactive. The MSInactive operation is also used by the serving VLR to notify the HLR of the cancellation of an MS's registration. The MSInactive operation is used by the HLR to provide the MS's CallHistoryCount to the AC when the SSD is shared with the VLR, and the VLR cancels the MS's registration.

The MSInactive operation is initiated with a TCAP INVOKE (LAST). This is carried by A TCAP QUERY WITH PERMISSION package. The Parameter Set is encoded as follows:

Table 66   MSInactive INVOKE Parameters

| MSInactive INVOKE Parameters | | | Timer: MSIT | |
|---|---|---|---|---|
| Field | Value | Type | Reference | Notes |
| Identifier | SET (NATIONAL 18) | M | 6.3.2.1 | |
| Length | variable octets | M | 6.3.2.1 | |
| Contents | | | | |
| ElectronicSerialNumber | | M | 6.5.2.63 | |
| MobileIdentificationNumber | | M | 6.5.2.81 | |
| CallHistoryCount | | O | 6.5.2.18 | a |
| Deregistration Type | | O | 6.5.2.55 | b |
| LocationAreaID | | O | 6.5.2.77 | c |
| SenderIdentificationNumber | | O | 6.5.2.116 | d |
| SMS_MessageWaitingIndicator | | O | 6.5.2.129 | e |

Notes:
a. Include if MS registration is canceled and if the SSD is shared.
b. Include from VLR to HLR and HLR to AC for MS deregistration.
c. May be included from MSC-V to VLR. Usage in the HLR is not defined.
d. Include to identify the functional entity sending this message.
e. Include to indicate that an SMS message is pending delivery.

*FIG. 10A*

| IP Address | Mobile ID | Presence Time/Date | Location |
|---|---|---|---|
| | | | |

IP MESSAGE TO APPLICATION SERVER
(e.g., to Chat Server)

*FIG. 10B*

| IP Address | Mobile ID | Log | Presence Time/Date | Location |
|---|---|---|---|---|
| | | #1 | | |
| | | #2 | | |
| | | #3 | | |
| | | #4 | | |
| | | #5 | | |
| | | #6 | | |

IP MESSAGE TO APPLICATION SERVER

*FIG. 11*

SAMPLE OF TABLE

| MSID | ACTIVE Y/N | LAST DATE/TIME | PARAMETER 1 | PARAMETER 2 | PARAMETER 3 |
|---|---|---|---|---|---|
| COMPARE FIELD | Y | N | Y | N | Y |
| SEND FIELD | Y | Y | Y | Y | Y |
| 9083067462 | Y | 120314520000 | XX | YY | ZZ | ns

INTELLIGENT DELIVERY AGENT FOR SHORT MESSAGE DISTRIBUTION CENTER

The present application is a continuation of U.S. patent application Ser. No. 14/314,675, entitled "Intelligent Delivery Agent for Short Message Distribution Center", filed on Jun. 25, 2014; which is a continuation of U.S. patent application Ser. No. 12/926,857, entitled "Intelligent Delivery Agent for Short Message Distribution Center", filed on Dec. 14, 2010, now U.S. Pat. No. 8,787,335; which in is a continuation of U.S. application Ser. No. 11/025,902, entitled "Intelligent Delivery Agent for Short Message Distribution Center", filed on Jan. 3, 2005, now U.S. Pat. No. 7,860,068; which is a continuation of U.S. patent application Ser. No. 09/832,012, entitled "Intelligent Delivery Agent for Short Message Distribution Center", filed on Apr. 11, 2001, now U.S. Pat. No. 6,839,562; which in turn claims priority from U.S. Provisional Patent Appl. No. 60/196,101, entitled "Management Messaging Middleware", filed on Apr. 11, 2000; and from U.S. Provisional Appl. No. 60/196,097, entitled "Message Distribution Center", filed on Apr. 11, 2000, the entirety of all six of which are expressly incorporated herein by reference.

BACKGROUND OF THE INVENTION

1. Field of the Invention

This invention relates generally to wireless carriers, Internet service providers (ISPs), and information content delivery services/providers. More particularly, it relates to Wireless Telecommunication, ANSI-41 D Wireless Intelligent Network (WIN) applications, and SMTP protocol to manage information content for a wireless carrier.

2. Background of Related Art

There are many "wireless" information content providers in the industry who have some information or service that is considered of value to the mobile phone user. Wireless Carriers are typically in favor of these content providers as they add value to Short Messaging Systems (SMS) and can drive up SMS and voice usage.

Unfortunately, content providers may not fully understand a particular wireless network and/or may not be fully sensitized to particular needs of carriers. This is because the carrier is often seen simply as a 'pipe' through which wireless messages are sent using SMTP protocol. Content providers maintain their own subscriber lists, and typically communicate with carriers merely as e-mail hosts.

All traffic is typically sent through an SMTP gateway, and thus information content, ads, etc., cannot be differentiated from higher priority 'personal' content. Problems arising from this include:

- Bulk information content can slow down and even jeopardize the carrier's SMTP Gateway performance;
- Personal messages cannot be given a higher priority than bulk messages;
- Bulk info content receives the same messaging parameters as personal messages, e.g., delivery receipts enabled, expiration date of 3-5 days, etc.;
- The carrier cannot differentiate between bulk messages among various providers and personal mail for billing purposes;
- Bulk senders deliver their content regardless of whether the device is on, and thus the carrier must handle message storage and retry attempts; and
- Bulk senders will typically continue to deliver content to churned wireless subscribers, wasting network resources and interfering with reuse of mobile numbers.

There is a need for a technique using SMTP and/or other conventional protocols to enable an easy way for content providers to distribute and/or differentiate their information without requiring them to change technologies.

BRIEF DESCRIPTION OF THE DRAWINGS

Features and advantages of the present invention will become apparent to those skilled in the art from the following description with reference to the drawings, in which:

FIG. 8B is a detailed depiction of all conventional parameters of a REGNOT message.

FIG. 9A is a simplified depiction of relevant parameters of a Mobile Subscriber Inactive message in conformance with SS7 and IS-41 standards utilized for determination n of inactive presence information in a MAST system, in accordance with the principles of the present invention.

FIG. 9B is a detailed description of the otherwise conventional MSInactive message parameters.

FIG. 10A is a simplified depiction of relevant parameters such as location in an exemplary Internet Protocol (IP) message sent from the MAST system to an application server (e.g., a Chat Server) via the Internet, in accordance with the principles of the present invention.

FIG. 10B is a simplified depiction of relevant parameters in another exemplary IP message such as a log of past presence and location information for a particular wireless device sent from the MAST system to an application server (e.g., a law enforcement authority) via the Internet, in accordance with the principles of the present invention.

FIG. 11 shows an exemplary Mobile Station Identity (MSID) ordered table, in accordance with the principles of the present invention.

SUMMARY OF THE INVENTION

Figure 1:
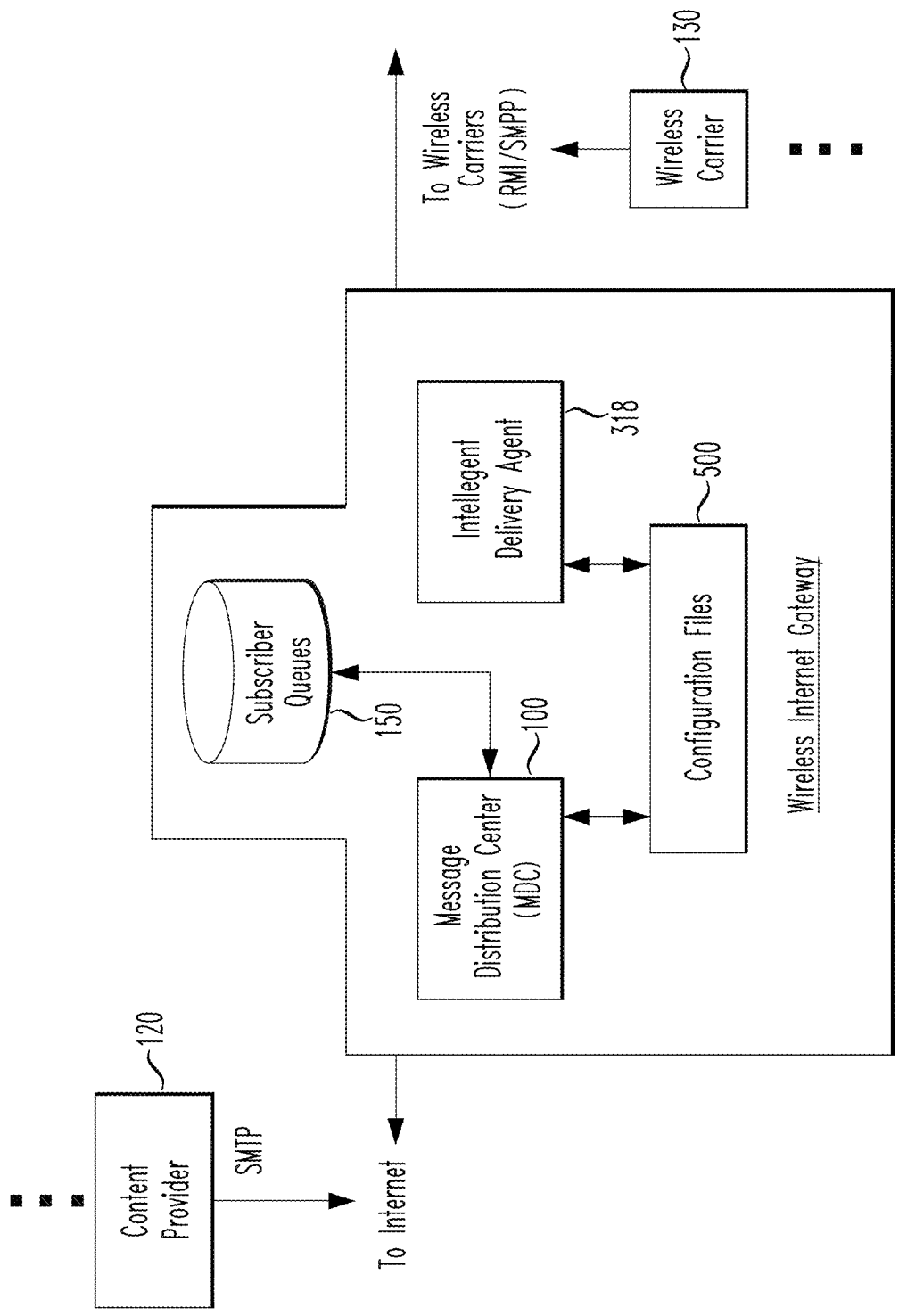
FIG. 1 shows a high level sequence diagram including a Message Distribution Center (MDC) enabling a Content Provider to direct messages via SMTP to the Message Distribution Center (MDC), in accordance with the principles of the present invention.

In accordance with the principles of the present invention, a message distribution center is interposed between a source of a short message and a wireless network including an intended recipient of the short message. The message distribution center comprises an SMTP protocol communication channel to receive the short message from the source of the short message. A plurality of subscriber queues are included, each corresponding to a different subscriber in the wireless network. The short message is placed in at least one of the plurality of subscriber queues before delivery to the wireless network. A communication channel communicates the short message to the wireless network.

In accordance with another aspect of the present invention, a method of throttling short messages to subscribers in a wireless network comprises forwarding a short message to a wireless network only when a receiving wireless device in said wireless network is known outside said wireless network to be online.

DETAILED DESCRIPTION OF ILLUSTRATIVE EMBODIMENTS

The present invention enables a Content Provider to direct messages via SMTP to an intermediatary Message Distribution Center (MDC) using standard SMTP Gateway and other well-known protocols.

In accordance with the principles of the present invention, short messages are inserted in the MDC into individual queues for each subscriber, and the provider is informed through conventional SMTP protocol messages that the short message has been accepted.

If the carrier has specifically disallowed service for a MIN (e.g., in the case of churning), then the content provider is informed through an SMTP interchange that the recipient is invalid. This encourages providers to discontinue service to terminated MINs, thereby reducing traffic to the MDC.

A Message Distribution Center (MDC) provides value to both wireless developers and wireless carriers. For instance, for the Wireless Developer, an MDC provides a single mechanism for interacting with subscribers of multiple carriers, regardless of each carrier's underlying infrastructure. For the carrier, an MDC can protect their SS7 network by intelligently throttling messages and configuring message delivery parameters to be more network friendly.

An MDC acts as a broker between carriers and developers. Different levels of relationships can be established with both carriers and developers, resulting in different levels of services that are available. The MDC interacts with a carrier's Short Message Service Center(s) (SMSCs) and/or SS7 network, allowing developers to guarantee message delivery, to interact with users via Mobile Terminated (MT) and Mobile Originated (MO) SMS, and possibly even to receive handset presence information.

Although the disclosed embodiments relate primarily to wireless services from the perspective of a Short Message Service (SMS), the disclosed MDC and related management middleware may support many types of wireless devices using the same API. For instance, suitable supported devices may include, e.g., 2-way Email pagers, the Palm VII™, and wireless application protocol (WAP) devices.

The disclosed MDC utilizes a Wireless Internet Gateway (WIG), which is a middleware messaging platform designed to facilitate communication between Internet devices and various wireless networks. A suitable WIG is disclosed in U.S. application Ser. No. 09/630,762 to SMITH, entitled "Wireless Internet Gateway", filed Aug. 2, 2000, the entirety of which is expressly incorporated herein by reference.

FIG. 1 shows a high level sequence diagram including a Message Distribution Center (MDC) enabling a Content Provider to direct messages via SMTP to the Message Distribution Center (MDC), in accordance with the principles of the present invention.

In particular, as shown in FIG. 1, an MDC gateway (MDC) 100 and Intelligent Delivery Agent (IDA) 318 are placed intermediary between a content provider 120 and a wireless carrier 130, to allow management of message delivery for each of a plurality of subscribers.

There are two main programs. The first application program is the MDC Gateway 100, which is essentially a Wireless Internet Gateway to check for and process information provider messages as shown and described herein. The second application program is the Intelligent Delivery Agent (IDA) 318, As shown in FIG. 1, the content provider 120 communicates with the MDC 100 using SMTP protocol messages, and the MDC communicates with the wireless carrier 130 preferably using RMI/SMPP techniques. A plurality of configuration files 500 configured by an appropriate system administrator control parameters in the MDC 100 and IDA 318.

Importantly, the MDC 100 includes a plurality of subscriber queues 150, preferably one for each subscriber having MDC support. The subscriber queues 150 may be integrated within the gateway of the MDC 100, or may be external to the gateway of the MDC 100 but nevertheless in direct communication with the gateway of the MDC 100.

The subscriber queue 150 preferably follows a First In First Out (FIFO) model, where the oldest messages are delivered first.

In accordance with the principles of the present invention, a particular wireless carrier 130 assigns a value for the maximum number of outstanding messages for a particular subscriber. This maximum number of outstanding messages can be used to establish a queue threshold. Thus, if one or more new messages cause the queue threshold to be exceeded, then the oldest messages may be deleted first from the particular subscriber queue 150 to make room for the new message(s). Of course, the subscriber queue 150 may be expanded in size as desired.

To provide protection from constantly growing subscriber queues 150, other rules may be established by the wireless carrier 130 to allow automatic deletion of particular messages from the subscriber queue 150.

For instance, an expiration period may be established whereby all messages more than x days old are removed. The expiration period may be established, e.g., on an individual subscriber basis (e.g., different subscription plans allowing larger queues and/or longer storage times), or on a global basis (e.g., all subscribers in a particular wireless network have a similar expiration time).

The use of automatic deletion of short messages from subscriber queues 150 is important, e.g., in the case of churned MINs, so that a new subscriber does not receive lingering messages from a previous subscriber with the same MIN.

Short messages to subscriber queues 150 may be delivered independently from one another and/or message delivery times spaced apart, thereby distributing message load over time and minimizing the negative effects of batch messaging on the wireless network.

The MDC 100 can also or alternatively be configured to avoid sending batch messages during the carrier's busy hour(s), thereby minimizing load pressures on the wireless network.

The use of an MDC 150 can aid the wireless carrier's network significantly, e.g., by forwarding short messages only when the relative handsets are turned on. Under this scenario, subscriber queues are not processed when the handset is powered off. This can reduce network storage requirements, delivery retry attempts, and overall SS7 usage. The MDC 100 can do this either by interacting with appropriate applications, e.g., with a mobile chat location register (MCLR), or generally by intelligent use of SMS delivery receipt data from the SMSC and Web Gateway. A suitable mobile chat location register (MCLR) is shown and described in U.S. application Ser. No. 09/814,363, entitled "Wireless Chat Automatic Status Tracking", filed Mar. 23, 2001 by Ung et al., the entirety of which is expressly incorporated herein by reference.

The MDC 100 can further be configured to send content from various providers to certain SMPP ports on a short message service center (SMSC). The receipt of such content allows distinct billing records to be generated for each type of service, e.g., ads, general content, premium content, etc.

Figure 2:
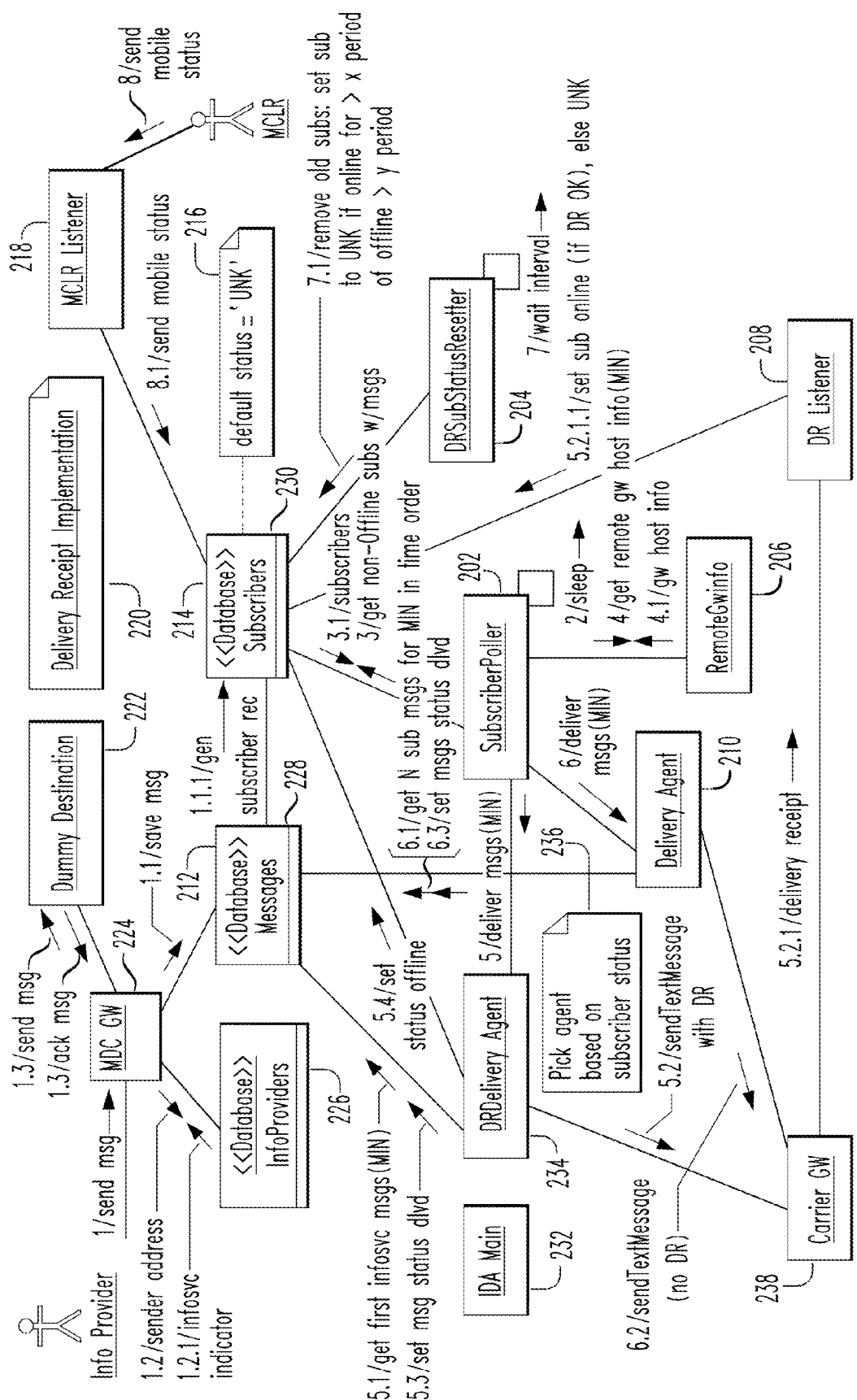
FIG. 2 illustrates exemplary software components and their relationships in an embodiment of a message distribution center (MDC), in accordance with one embodiment of the present invention.

FIG. 2 illustrates exemplary software components and their relationships in an embodiment of a message distribution center (MDC), in accordance with one embodiment of the present invention.

In the disclosed embodiments, a Wireless Internet Gateway (WIG) was modified to include another 'dev/null' destination, which acknowledges short messages from a queueMonitor, but does not actually process them. The short messages remain in the Messages table of the database, where they are retrieved by a software component referred to herein as an "Intelligent Delivery Agent" (IDA).

The IDA retrieves messages from the Messages table in the database for subscribers, e.g., when they power on their handsets, subject to any desired rules. The IDA can become aware of subscriber power-ups through any appropriate trigger, e.g., via an SMPP Delivery Receipt mechanism, through Mobile Chat Location Register (MCLR) software, etc. Preferably, the IDA throttles short message traffic to any or all subscribers, e.g., optionally waiting until the busy hour is over before beginning the transmission.

The MDC Gateway 100 may be, e.g., a standard WIG to which the provider sends messages through SMTP, RMI, HTTP, or suitable middleware software. As shown in FIG. 2, the MDC 100 includes a new DummyDestination, which simply acknowledges receipt from a particular subscriber queue 150, but does not attempt delivery. Delivery may be accomplished through an Intelligent Delivery Agent process, which polls a messages table that is populated when the MDC Gateway 100 receives relevant short messages.

To most efficiently use the MDC gateway 100, the SMTP session preferably assigns the msgType property based on the sender's Email address and using InfoProviders information from the database. This allows the MDC Gateway 100 to determine that SMTP messages from an Information Provider (e.g., INFO@NEWS.COM) should use the Dummy Destination and be queried by the IDA. If the short message is submitted via an RMI mechanism, then the sender will explicitly define the msgType.

When the MDC 100 inserts a short message record, an Oracle™ trigger may be used to create a subscriber record in the Subscribers table in the database if such a record does not already exist for the recipient.

The Subscribers table may contain, preferably at a minimum, a MIN, status (e.g., 'Online', 'Offline', 'Unknown'), and the time of the last status update. When first created, the status may default to 'Unknown'.

The IDA may be a separate program that delivers messages from the database to appropriate recipients via a RemoteSMPP RMI Interface of the carrier's gateway. The IDA preferably determines subscriber availability via, e.g., an MCLR or via Delivery Receipts. The former approach is likely more efficient, but the latter approach is more likely to work with most carrier environments.

The Delivery Receipt method is considered to be more complicated. The Delivery Receipt method attempts to find the status of a subscriber's handset by examining delivery receipts from messages sent to the subscriber.

As shown in FIG. 2, a SubscriberPoller agent 202 starts the process by gathering a list of subscribers from a Subscribers table 214 at some time interval (z). If a particular subscriber is online, then the DeliveryAgent object 210 is notified.

The DeliveryAgent 210 then gathers some pre-configured number of messages in time order for the subscriber from the Messages table 228 in the database, and sends them to the Carrier gateway 238 for delivery to the subscriber. There is no delivery receipt associated with these messages, so if the subscriber's handset is turned off the short messages are not delivered and not resent. This is why it is preferred that only a pre-configured number of short messages be sent before the subscriber's status is checked again by SubscriberPoller 202.

If a subscriber's status is unknown, then a DRDeliverAgent 234 is notified to send one message via the Carrier gateway 238 to the subscriber with a delivery receipt requested. When it sends the message, it sets the subscriber status as offline so that the SubscriberPoller 202 will ignore that subscriber.

The delivery receipt will arrive at DR Listener 208. If the delivery receipt indicates failure, then the subscriber status is set as 'unknown', otherwise the subscriber status is set as 'online'. The SubscriberPoller 202 wakes up shortly thereafter to take advantage of the user going online.

Because there is no direct feedback from the handset, there is no conventional information received when a handset is turned off or on. DBSubStatusResetter 204 makes assumptions about how long a handset typically stays on or goes off.

If a handset has been marked as online for a period of time (x), then DRSubStatusResetter 204 sets the corresponding subscriber status to 'unknown', which will restart the delivery receipt cycle again. If a subscriber has been marked as 'offline' for a different period of time (y), then the subscriber is marked as unknown, again restarting the delivery receipt cycle.

To summarize, there are three time periods involved in the Delivery Receipt method. Time x is the average time that a handset is online. Time y is the average time that a handset is offline. Time z is how often the Subscribers table 214 is polled for a list of subscribers.

The three periods mentioned (x, y, and z) must have a certain relationship to one another. Time z must be smaller than time x and time y. Time x and time y's relationship to one another doesn't matter. Time z must be smaller than time x so that when a subscriber goes online, messages are sent to it before time x expires and online subscribers are set to 'unknown'. Time z should be smaller than time y, otherwise the subscriber will be sent another message before DR Listener 208 has had a chance to receive the delivery receipt. This implies that time z will also be longer than the expected time for a delivery receipt.

A SubscriberCleanUp agent may be implemented to clean out subscribers that haven't had messages sent to them for a pre-defined period of time. This will ensure that the subscriber database doesn't grow without bound. Subscribers may have taken their name from the information provider's subscriber list.

Another technique mentioned above is to use an MCLR facility. In this situation, the MCLR will know explicitly when a handset is turned off or on. The MCLR Listener 218 then updates the Subscribers table 214 accordingly. The SubscriberPoller 202 always sees only online subscribers. It then uses the DeliveryAgent 210 to send the messages without a delivery receipt requested.

When the MCLR Listener 218 is active, then the DRDeliverAgent 234, DR Listener 208, and DBSubStatusResetter 204 are all inactive. When the three delivery receipt entities are active, then the MCLR Listener 218 is inactive.

The IDA Main 232 activates appropriate facilities based on a configuration file.

In an MCLR implementation, the DRDeliveryAgent 234, DR Listener 208, and DRSubStatusResetter 204 may not be used.

Figure 3:
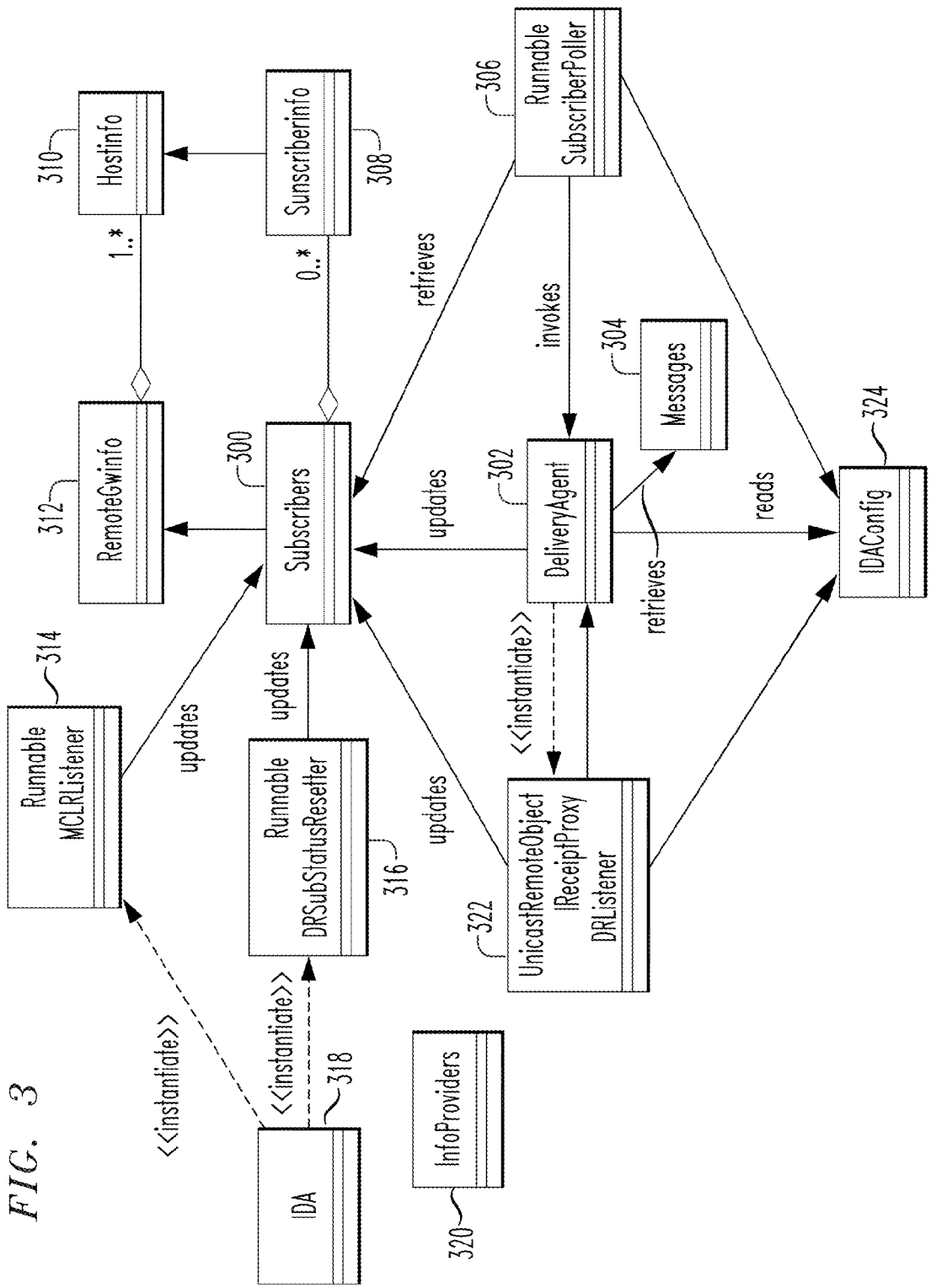
FIG. 3 is an exemplary class diagram which shows further details of an embodiment of a Message Distribution Center, in accordance with the principles of the present invention.

FIG. 3 is an exemplary class diagram which shows further details of an embodiment of a Message Distribution Center, in accordance with the principles of the present invention. In particular, FIG. 3 shows exemplary classes that may be activated and used to determine subscriber status and to actually deliver messages.

As shown in FIG. 3, an IDA main class 318 is responsible for deciding which subscriber status determination strategy to use. The IDA class 318 may receive this information from a configuration file. The IDA class 318 instantiates and activates an MCLRListener class 314 if that facility is to be used to retrieve a handset's online/offline status. If the strategy is to use delivery receipts, then the IDA class 318 instead instantiates and activates the DRListener 322 and DRSubStatusResetter 316 classes.

A SubscriberPoller 306 class gets a list of subscribers whose status is 'unknown' or 'online' from the database. If a subscriber's status is 'unknown', the SubscriberPoller 306 invokes a method in a DeliveryAgent class 302 to send a message requesting a delivery receipt. If the subscriber's status is 'online', then the DeliveryAgent 302 sends messages without a delivery receipt to the subscriber.

The DeliveryAgent 302 is responsible for averaging out the load on the carrier's system. It may do this by spreading out the messages over time, allowing normal traffic to be sent more quickly. The DeliveryAgent 302 may also hold off sending batch messages during the carrier's busy time. This information may be maintained in a configuration file and retrieved through a DeliverySetupInfo class.

The DeliveryAgent 302 can also be configured to send messages over certain SMPP ports to the carrier gateway 238 for tracking the amount of traffic that an information provider is sending. The DeliveryAgent 302 may accomplish this by tagging the message with a message type indicating that it is an MDC message. The configuration file may be set up so that messages of an MDC type will be sent to certain SMPP ports by the carrier gateway 238.

Both the Subscribers 300 and Messages 304 classes may be wrappers around their respective database tables, to isolate JDBC calls to these classes only and/or to place the data in a useful format.

The IDA 318 may send messages and/or decide blackout periods on a global basis, i.e., regardless of the destination of any particular message. One enhancement to this is to apply these on a per-carrier basis since carriers can be in different time zones or have more or less capable hardware.

One advantage provided by the present invention is that SMTP is a well-known protocol and an easy way for content providers to distribute their information.

A Message Distribution Center (MDC) in accordance with the principles of the present invention provides an ideal solution. It addresses the problems faced by the carrier without requiring the information providers to change technologies.

The principles of the present invention have applicability for usage with wireless intelligent network (WIN) and SMTP applications, e.g., those already otherwise containing a Internet gateway application for routing information through an SMTP gateway. Moreover, the MDC allows content providers to continue with their current mode of operation without placing the carrier's network at risk. The MDC can receive messages using a variety of protocols, including SMTP. It automatically routes messages to the appropriate carrier based on MIN range. Instead of delivering SMTP content directly to the carrier, it is delivered to the MDC. The MDC then ensures that the content is delivered in a 'carrier-friendly' manner.

MDC can provide the Info Provider with delivery statistics, e.g., what percentage of messages are being delivered.

The MDC helps prevent the carrier from being overwhelmed by bulk messaging content and provides the following benefits:

- bulk message traffic is distributed across time
- messages are delivered over more efficient protocols than SMTP through the carrier's Wireless Internet Gateway
- messages are only delivered when handsets are on, thereby eliminating network storage and retries
- messages are delivered with appropriate urgency, delivery receipt, expiration times, and billing identifiers
- individual bulk message queues allow the carrier to limit the number of messages that can be queued per subscriber
- bulk messaging can be disabled for individual accounts when subscribers churn
- bulk message delivery statistics are available to the carrier via a web interface.

Acknowledgement of Delivery Receipts

It is preferred that remote gateways be sent to via a remote queue. This is because of the uncertainty about the link IDs which would be used by the remote gateway per MIN. Rather, all that is known is that a gateway takes a certain range of MINs. However, the gateway itself may partition out the MINs to be sent via different protocols such as SMPP, TNPP or others. That information is preferably not kept at the IDA 318, preventing use of the remote SMPP classes. However, the remote queue has no provision for sending information back. It is preferred that this ability be provided so as to receive back delivery receipts.

In accordance with the principles of the present invention, a ReceiptNotifier class may be added to the code. When such a ReceiptNotifier class detects that a delivery receipt is to go back to the IDA 318 (i.e., a hostname or IP is in receiptEmail, receiptMIN or a new receipt field in the Message class 304), it establishes a connection with the IDA 318 and sends back the receipt information.

Two exemplary methods to receive back at the IDA 318 the delivery receipt, both involving gateway software running at a remote site to recognize first that a delivery receipt is necessary. One was discussed above, while the other establishes a connection back to the IDA 318 and a protocol to use. In accordance with the principles of the present invention, RMI techniques may be used to accomplish this.

When the remote gateway sees an IDA delivery receipt request, it may perform a Naming.lookup( ) based on the URL in the delivery receipt field in the Message. It then sends the message name field from the Message and the delivery status. Once sent, it can abandon the object it got back from the Naming.lookup( ) call.

This implies that the remote gateway will be an RMI client to the IDA delivery receipt server. Typically the remote gateway has been acting as an RMI server. However, this scheme of being a client falls in line with how the SMTP delivery receipt is sent, that is, the remote gateway acts as a mail client in this case.

An IReceiptProxy interface 322 may be added to allow communication between the MDC gateway 100 and the IDA 318. The DRListener agent 322 in the IDA 318 preferably acts as an RMI server to receive the acknowledgements from the MDC gateway class ReceiptNotifier. The receiptEmail field in the Message preferably contains the hostname to respond back to. ReceiptNotifier distinguishes between email addresses and host names in this field and sends the delivery receipt accordingly.

The IDA 318 is configured via appropriate configuration files, e.g., an ida.cfg file, an IdaRemoteHostInfo.properties file, and database tables (described more fully herein below). It is preferred that the IDA 318 use the same database as the MDC gateway 100. The MDC gateway 100 and the IDA 318 preferably utilize tables and configuration/property files, which should be set up correctly. In operation, the setup of MDC and IDA configuration/property files is typically the responsibility of an MDC administrator. Exemplary values for configurable files are provided herein below.

The MDC 100 and IDA 318 work together to handle the large amount of traffic generated by information providers. The MDC 100 automatically routes messages to the IDA 318 based on if the message is from an information provider. Instead of delivering SMTP content directly to the carrier, the MDC 100 delivers it to the IDA 318. The IDA 318 then ensures that the content is delivered in a 'carrier-friendly' manner.

The MDC Gateway 100 is started using a standard smsgw.sh script. The IDA 318 may be started separately with an ida.sh script. The only necessary dependency between the two programs is the database tables they share. This means that either can be started without the other running. However, nothing useful happens until both are running.

Table 1 describes relevant modules in the MDC Gateway 100.

TABLE 1

| Module Name | Package |
|---|---|
| Base36.java | tcs.ain.smsgw |
| Config.java | tcs.ain.smsgw |
| DummyDestination.java | tcs.ain.smsgw |
| IReceiptProxy.java | tcs.ain.smsgw |
| Message.java | tcs.ain.smsgw |
| MessageStoreDB.java | tcs.ain.smsgw |
| ReceiptNotifier.java | tcs.ain.smsgw |
| SMPPReceiptMessage.java | tcs.ain.smpp |
| SMPPResource.java | tcs.ain.smpp |
| SMTPMessageData.java | tcs.ain.smsgw |
| SMTPSession.java | tcs.ain.smsgw |

Table 2 identifies relevant exemplary modules in an IDAm 318, packed in the exemplary embodiment in a "tcs.ain.ida" package and located in a directory in the MDC gateway 100, e.g., called "smswebgw".

TABLE 2

| Module Name |
|---|
| DRListener.java |
| DRSubStatusResetter.java |
| DeliveryAgent.java |
| HostInfo.java |
| IDA.java |
| IDAConfig.java |
| IdaDebug.java |
| InfoProviders.java |
| MCLRListener.java |
| Messages.java |
| RemoteGwInfo.java |
| SubscriberInfo.java |
| SubscriberPoller.java |
| Subscribers.java |

The MDC Gateway 100 uses a number of database tables.

The following are exemplary configurable tables 500 specifically used by the MDC Gateway 100 and the IDA 318.

INFOPROVIDER Configuration Table

An INFOPROVIDER table provides a list of information providers. If an information provider is on this list, the MDC Gateway 100 will route a relevant message to the IDA 318. The INFOPROVIDER table is used only by the MDC Gateway 100.

The INFOPROVIDER table is preferably configured by an appropriate system administrator.

TABLE 3

| Column | Data Type | Null? | Notes |
|---|---|---|---|
| MSGSENDER | CHAR(150) | N | Should match what the information provider puts in the sender field in mail |
| LASTUPDATE | NUMBER | Y | Currently unused. Should represent time when row was inserted |
| INFOPROVIDERID | NUMBER(9) | Y | |
| PROVIDERNAME | VARCHAR2(50) | Y | |
| SERVERID | VARCHAR(50) | Y | |
| SERVERPASSWORD | VARCHAR2(50) | Y | |

LINKID_NPANXX Configuration Table

A LINKID_NPANXX configurable table, used by both the MDC gateway 100 and the IDA 318 associates a MIN with a carrier's remote gateway. Link IDs are defined for each carrier in a GWDest.properties file from smswebgw/smsgw. The IdaRemoteHostInfo.properties file mentioned in the next section should align with the link IDs.

The LINKID_NPANXX table is preferably configured by an appropriate administrator.

TABLE 4

| Column | Data Type | Null? | Notes |
| --- | --- | --- | --- |
| LINKID | NUMBER(2) | Y | This number is an ID assigned to each carrier with a remote gateway to which the IDA can send messages. |
| NPA_NXX | VARCHAR2(6) | N | Represents the first 6 digits of a MIN and is used to assign a MIN to a remote gateway. |

MESSAGES Configuration Table

A MESSAGES table contains information about a message being sent. The MESSAGES table may be used by both the MDC gateway 100 and the IDA 318.

TABLE 5

| Column | Data Type | Null? |
| --- | --- | --- |
| MSGTYPE | NUMBER(2) | Y |
| MSGSOURCE | NUMBER(2) | Y |
| MSGSTATUS | NUMBER(2) | Y |
| MSGSUBSTATUSDESC | VARCHAR2(255) | Y |
| MSGMIN | VARCHAR2(30) | Y |
| MSGCALLBACK | VARCHAR2(30) | Y |
| MSGSENDER | VARCHAR2(150) | Y |
| MSGSUBJECT | VARCHAR2(255) | Y |
| MSGTEXT | VARCHAR2(2000) | Y |
| MSGSRCADDR | VARCHAR2(150) | Y |
| SMSCMSGID | VARCHAR2(10) | Y |
| RECEIPTEMAIL | VARCHAR2(70) | Y |
| RECEIPTMIN | VARCHAR2(30) | Y |
| RECEIPTCALLBACK | VARCHAR2(30) | Y |
| MSGNAME (the unique identifier (key)) | VARCHAR2(20 | N |

TABLE 5-continued

| Column | Data Type | Null? |
| --- | --- | --- |
| SRCGWID | VARCHAR2(5) | Y |
| MSGARRIVE | NUMBER | Y |
| MSGSENT | NUMBER | Y |
| MSGFINAL | NUMBER | Y |
| MSGSUBMIT | NUMBER | Y |
| MSGEXPIRE | NUMBER | Y |

SUBSCRIBERS Configuration Table

A SUBSCRIBERS table is used internally by the IDA 318. It keeps track of subscribers that have been sent messages by an information provider. The SUBSCRIBERS table is used by both the MDC Gateway 100 and the IDA 318.

TABLE 6

| Column | Data Type | Null? | Notes |
| --- | --- | --- | --- |
| SUBSCRIBERMIN | VARCHAR2(30) | N | |
| STATUS | NUMBER(2) | N | Internal value (0-offline, 1-online, 2-unknown) |
| LASTSTATUSUPDATETIME | NUMBER | Y | Last time the status was changed |
| LASTMSGTIME | NUMBER | Y | Last time the subscriber received a message |

There is only one trigger in the exemplary embodiments defined for the IDA 318, called subsc_update. Whenever a message is added to the MESSAGES table, the subscriber is added or updated in the SUBSCRIBERS table if the message is from an information provider. This may be indicated, e.g., by bit 6 being set in an msgsource field.

IDA Configuration File

An ida.cfg file contains parameters that control the behavior of the IDA program 318. It is preferred that the ida.cfg file reside in the same directory as the executing IDA program 318. Table 7 shows exemplary parameters and values of an ida.cfg file, in accordance with the principles of the present invention.

TABLE 7

| Parameter | Purpose | Field Value | Field Explanation |
| --- | --- | --- | --- |
| | | General Parameters | |
| SubscriberStrategy | Strategy used to find subscriber status | DELIVERY_RECEIPT (default) | Have the remote gateway request a delivery receipt |
| | | MCLR | Use mobile chat location register (not implemented yet) |
| debugmode | Used to set the IDA to print run-time debug messages | true | Turn on run-time messages |
| | | false (default) | Turn off run-time messages |
| RemoteQueueName | Name of remote queue to send messages to | RemoteQueue (default) | Only changed for debugging purposes |
| DRServerName | Name of service to receive delivery receipts | DeliveryReciptServer | Only changed for debugging purposes |
| LogFileName | Name of file to receive log messages | text string | Absolute or relative path to a logger file Directory must exist already. |

TABLE 7-continued

| Parameter | Purpose | Field Value | Field Explanation |
|---|---|---|---|
| Database Parameters | | | |
| DbClass | The driver to use for talking with the database | text string | Class name to use for database access. System must be configured with proper drivers |
| DbUrl | The reference to the database and machine where database resides | text string | Legal URL for the driver |
| DbAccount | Account name | text string | |
| DbPassword | Password to account | text string | |
| Delivery Setup Parameters | | | |
| MsgGroupSize | Number of messages to send to a subscriber at a time | number | |
| MsgSendRate | Number of messages to send per minute | number | |
| MsgHoldTimes | Time to not send msgs (local time). Repeat the line for multiple periods | Start time and end time in 24 hour format, HHMM | Must have start and end times. If end is less than start, then cross over of midnight is assumed. |
| Polling/Expiration Rates Parameters | | | |
| SubscriberOnlineTime | Maximum number of seconds a subscriber stays online | number | |
| SubscriberOfflineTime | Maximum number of seconds a subscriber stays offline | number | |
| SubscriberXmitPollTime | Time between checks for subscriber messages (seconds) | number | This must be less than half the value of the smaller of SubscriberOnlineTime & SubscriberOfflineTime |
| SubscriberExpireTime | Hours without a message before a subscriber is purged. | number | |

IdaRemoteHostInfo.properties File

This file relates a link ID for a MIN to a remote host name, and whether it can support delivery receipts. A leading number followed by an underscore corresponds to the link ID in the LINKID_NPANXX table and the GWDest.properties file.

The form of an entry in the disclosed IdaRemoteHostInfo.properties file may be, e.g., <linkid>_<parameter>=value. Permissible parameters and their values for the exemplary IdaRemoteHostInfo.properties files are shown in Table 8.

TABLE 8

| Parameter | Purpose | Values |
|---|---|---|
| carrierName | Short form of the carrier name | Text string |
| carrierNameLong | Long form of the carrier name | Text string |
| carrierHostname | The host name of the machine with the carrier's remote gateway | The name must be resolvable via DNS. |

TABLE 8-continued

| Parameter | Purpose | Values |
|---|---|---|
| receiptSupported | Indicates if remote gateway can send delivery receipts. The gateway must be running the updated version of TCS gateway software and have enable_web in smscgw.cfg set to true | true, yes, false or no |

Table 9 is an example showing how the carrier data may be formatted in the IdaRemoteHostInfo.properties file.

TABLE 9

0_carrierName=AT
0_carrierNameLong=AirTouch
0_carrierHostname=Sms2way.airtouch.net
0_receiptSupported=yes
3_carrierName=BAM
3_carrierNameLong=Bell Atlantic Mobile

TABLE 9-continued

```
3_carrierHostname=smsc.bam.com
3_receiptSupported=yes
24_carrierName=FR
24_carrierNameLong=Frontier
24_carrierHostname=msg.frontiercellular.com
24_receiptSupported=no
```

MDC Configuration File

An smscgw.cfg file may be used to configure the software of the MDC Gateway 100. The disclosed MDC Gateway 100 requires several parameters to be set to route short messages from information providers to the IDA 318. The Remote Gateways that the IDA 318 talks to preferably have a flag such as "enable_web" set if they are to be capable of sending delivery receipts back to the IDA 318. Tables 10 and 11 show exemplary parameters in an MDC Configuration File, in accordance with the principles of the present invention.

TABLE 10 smscgw.cfg MDC Gateway Configuration

| Parameter | MDC Value | Notes |
| --- | --- | --- |
| enable_mdc | yes | Causes check for information provider messages |
| enable_smtp | yes | Remote gateway routes mail to the IDA. |
| enable_web | yes | Allows remote queue calls via RMI |
| MessageStore Type | DB | IDA can only work with database activated |

TABLE 11 smscgw.cfg Remote Gateway Configuration

| Parameter | MDC Value | Notes |
| --- | --- | --- |
| enable_web | yes | Allows remote queue calls via RMI |

The present invention relates to a technique and apparatus to provide status tracking of presence and/or location of a mobile, wireless device to a requesting entity even outside of a particular wireless system. This allows wireless service providers the ability to monitor and log changes in the status of mobile stations within and/or outside their networks enabling the development of multiple applications and network services. Embodiments are disclosed wherein presence and/or location information is provided to entities outside of a particular servicing wireless network using the mechanisms of call processing components of a mobile network (e.g., call setup procedures), and using standard mechanisms currently available to any appropriately conforming Mobile Switching Center (MSC) element. An embodiment implementing a wireless chat automatic status tracking system and method is also disclosed.

Mobile presence and location are key concepts for location-based services and applications which require knowledge of mobile station/subscriber availability. Currently, conventional systems do not provide such wireless intelligent network (WIN) service for wireless devices.

It is important to note that existing systems and techniques have been conventionally located outside of a wireless network. As such, the existing systems have not been privy to, nor had the need to be privy to, triggers needed to obtain true mobile presence or location information.

Mobile Activity Status Tracker (MAST)

One series of disclosed embodiments relate to a software application package which tracks and reports status and activity of mobile wireless devices in a wireless network using mobile registration message, inactivity message forwarding, and/or mobile automatic notification of subscriber status to TCP/IP entities. This embodiment of a mobile activity status tracker is referred to herein as a Mobile Activity Status Tracker (MAST).

In accordance with the principles of the present invention, status changes that are recorded are sent via TCP/IP communications to other service provider-specific applications. The MAST system duplicates the same or similar information of a corresponding HLR, but is available as an external database entity which functions and communications are not restricted by SS7 standards.

Tracking in accordance with the principles of the present invention utilizes registration/de-registration activity of mobile stations. Utilizing status changes for a particular mobile station, key events can be noted regarding presence and/or location of the particular mobile station.

The MAST application offers entities (e.g., Internet and others) outside of a wireless infrastructure the ability to receive presence and/or location information regarding a particular mobile station to network entities outside of that which is servicing a particular wireless device. As disclosed, the MAST application has the ability to pull presence and/or location information or to push presence and/or location information to a requesting entity as desired.

Certain capabilities such as registration notification forwarding mechanisms/Registration Notification Forward Message and SMPP client which are basic to this application, are described in detail in two pending U.S. applications by the same Assignee as the present case. In particular, an exemplary SMSC is described in co-pending and co-owned U.S. application Ser. No. 09/322,929, entitled "Short Message Service Notification Between Multiple Short Message Service Centers", filed Jun. 1, 1999, by Timothy J. Lorello and Reuben D. Hart, the entirety of which is explicitly incorporated herein by reference. Moreover, an exemplary Prepaid functionality and architecture is described in co-pending and co-owned U.S. application Ser. No. 09/533,805, entitled "Prepaid Call Management In Intelligent Network", filed Mar. 23, 2000, by Elizabeth Countryman, Timothy J. Lorello, Mark Titus, and Dara Ung, the entirety of which is explicitly incorporated herein by reference.

The Mobile Activity Status Tracker (MAST) is a Service Package Application (SPA) that allows wireless service providers to monitor and log changes in the status of mobile stations within their networks. The status changes that are recorded are sent via TCP/IP to other servers for service provider-specific applications. The tracking involves the registration/de-registration activity and location of the mobile stations. The tracking need not track call-specific information, e.g., called telephone numbers or information regarding conversations sustained by the tracked wireless subscribers.

Some disclosed embodiments relate to the use of a Home Location Register (HLR) which is integrated with a Mobile Switching Center (MSC) on a common platform, referred to herein as Integrated Home Location Registers (I-HLRs) commercially available from LUCENT TECHNOLOGIES INC. in Murray Hill, N.J. Other embodiments relate to the use of a stand-alone HLR separate from the MSC platform, referred to herein as Stand alone HLR's (S-HLR). All types of HLRs are collectively referred to herein as an HLR.

The disclosed MAST SPA is implemented on an Advantage Service Control Point (SCP) Wireless Intelligent Network Platform, commercially available from LUCENT TECHNOLOGIES INC. The SCP provides the required ANSI SS7 and TCP/IP protocol support and Service Circuit Handlers (SCH) for the MAST SPA.

In accordance with the principles of the present invention, the MAST SPA receives mobile activity notifications from an HLR, and forwards selected parameters upon request or configuration to servers external to the wireless network over a TCP/IP communication link (e.g., over the Internet or over an Intranet).

Figure 4:
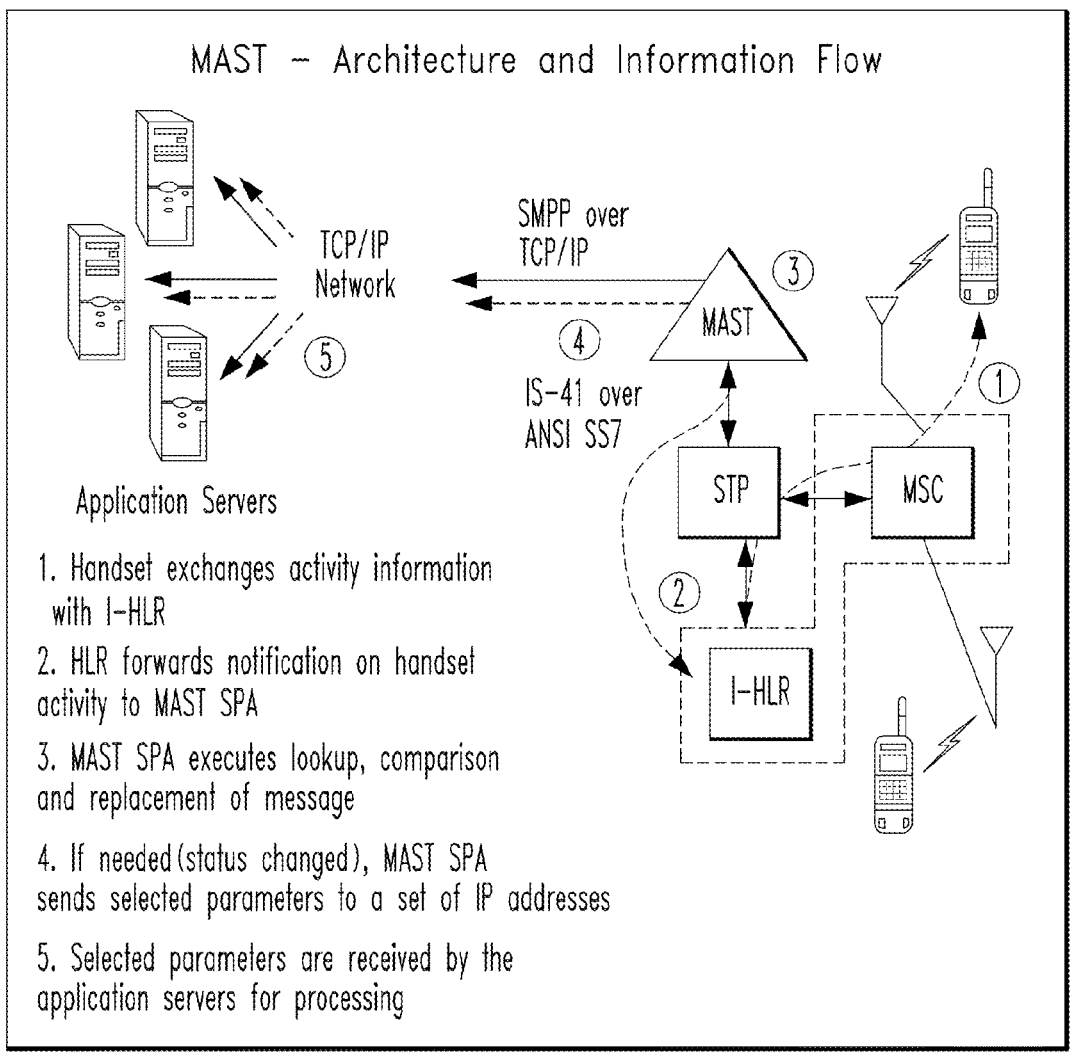
FIG. 4 shows an exemplary architecture and information flow of a mobile activity status tracker (MAST) system, in accordance with the principles of the present invention.

FIG. 4 shows an exemplary architecture and information flow of a mobile activity status tracker (MAST) system, in accordance with the principles of the present invention.

In particular, as shown in FIG. 4, the operation of the exemplary MAST SPA includes the following exemplary steps:

(1) The handset exchanges activity information with the I-HLR, which in turn sends the Mobile Station Identity (MSID) of the mobile station and a set of relevant parameters to the MAST SPA in a registration notification forwarding mechanism message.

(2) The MAST SPA creates a temporary record for that mobile handset based on the MSID. The MAST performs a lookup in a database of existing records, using the MSID as a key. If there is no record for the MSID, then the temporary record is stored in the database. If there is a record for the same MSID, the MAST compares the temporary record with that found in the database to determine any changes in the activity status of the mobile station (or any other relevant parameters). If the activity status is the same (i.e., unchanged), the MAST overwrites the old record with the new one. On the other hand, if the activity status has changed, the activity status of the relevant mobile wireless device will be Notified or Forwarded to one or more application servers having access to the Internet using an appropriate TCP/IP interface and appropriate IP addresses (or other suitable protocol and communication path, e.g., SS7). To this end, the MAST SPA will forward a set of selected parameters (e.g., a subset of the parameters available in the temporary record) to one or more requesting or pre-configured applications servers using corresponding Internet Protocol (IP) addresses. The MAST then replaces the existing, older record with the new, updated record.

Preferably, the MAST resides on an SCP and accepts copies of IS-41 Registration Notification and MSInactive messages from the HLR(s).

Figure 5A:
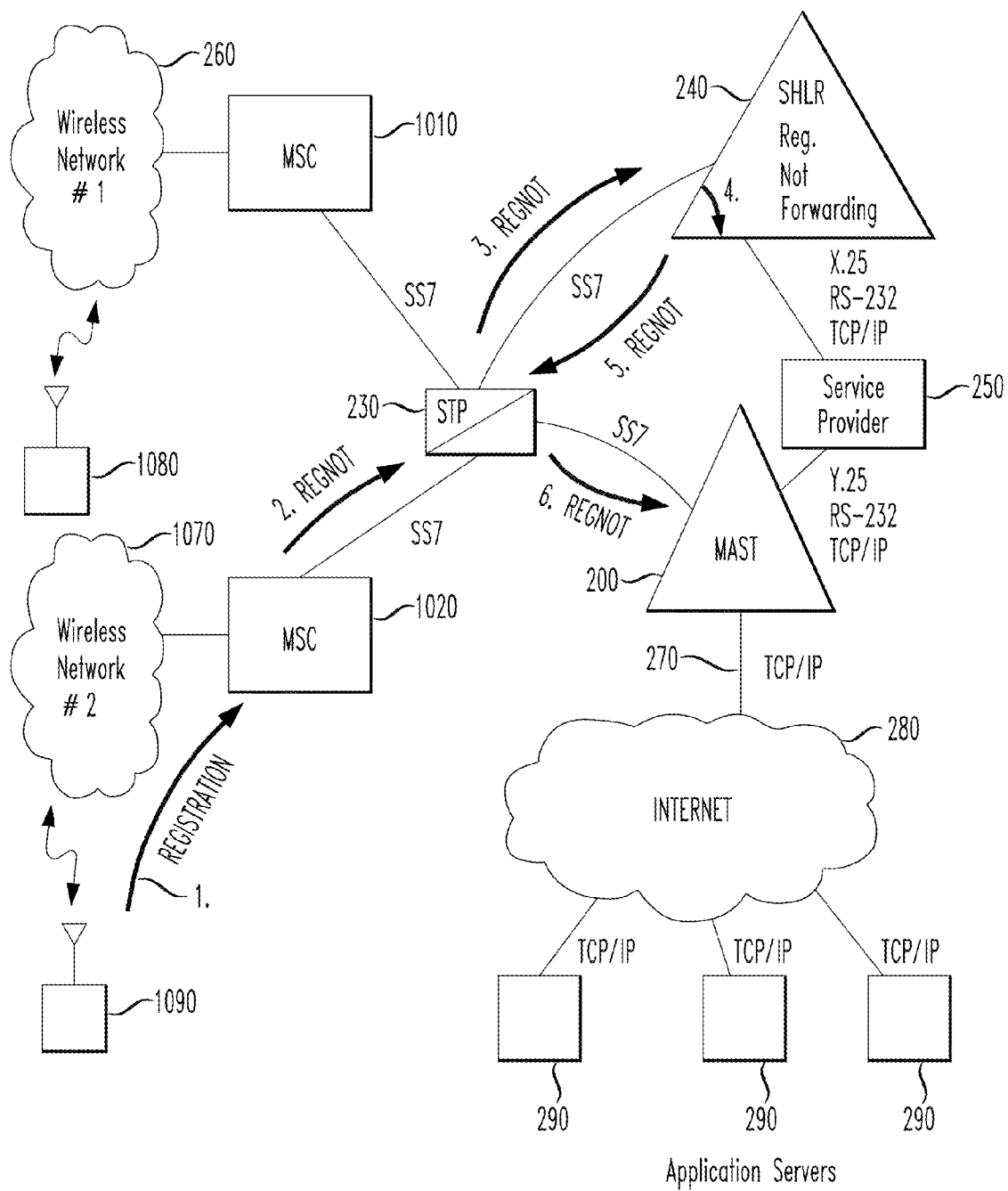
FIG. 5A is a more detailed architecture and information flow of an embodiment of a MAST system corresponding to a stand-alone Home Location Register (SHLR) including a registration notification forwarding mechanism utilizing message flows in conformance with SS7 standards and IS-41 standards, in accordance with the principles of the present invention.
Figure 5B:
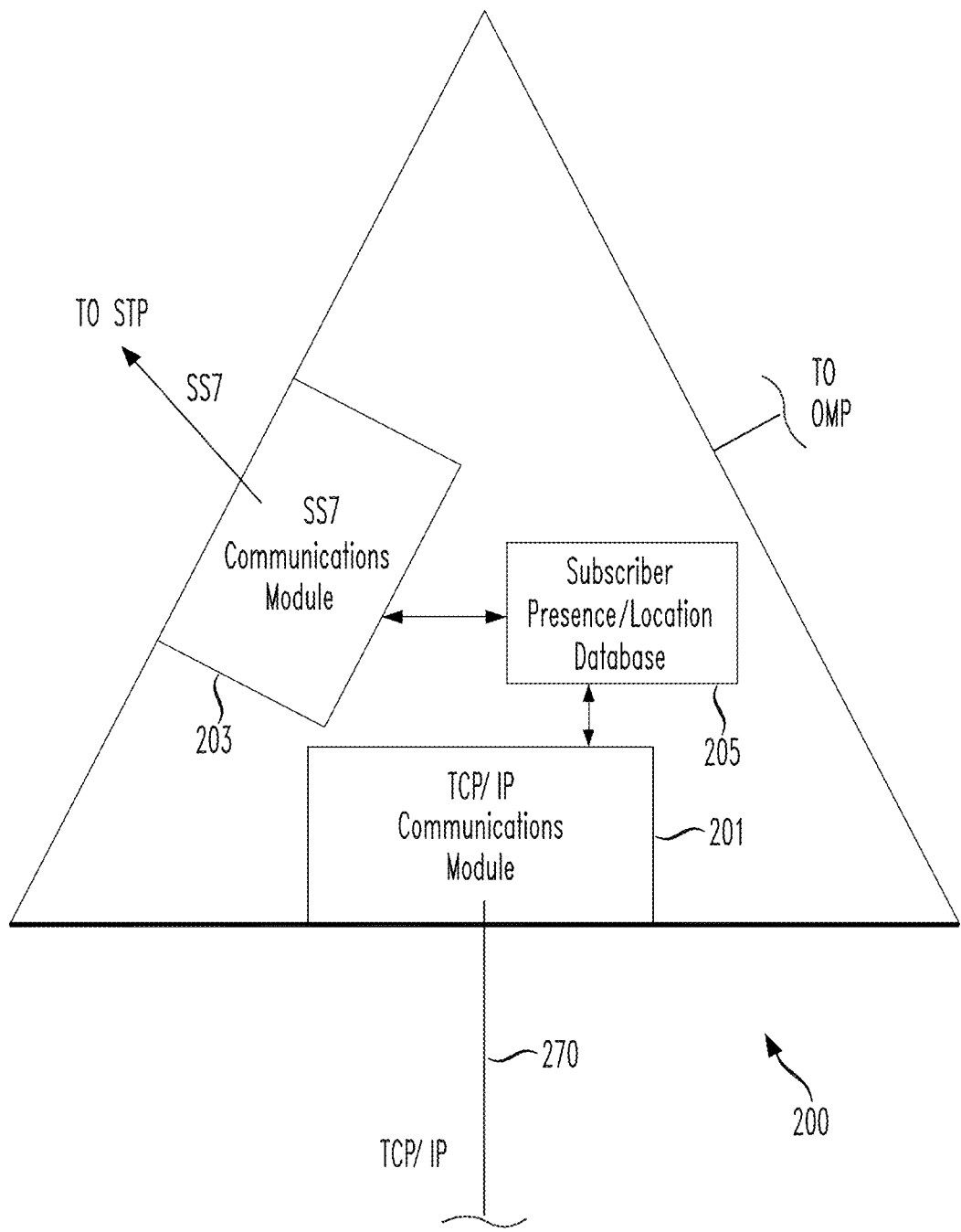
FIG. 5B shows a block diagram of the basic elements of an exemplary MAST system shown in FIG. 5.

FIG. 5 is a more detailed architecture and information flow of an embodiment of a MAST system 200 corresponding to a stand-alone Home Location Register (SHLR) 240 including a registration notification forwarding mechanism utilizing message flows in conformance with SS7 standards and IS-41 standards, in accordance with the principles of the present invention.

In particular, FIG. 5 shows a MAST system 200 implemented by a particular service provider corresponding to a first wireless network 260. The first wireless network 260 also includes an MSC 1010, and a SHLR 240.

A second wireless network 1070 is shown for completeness and perspective. The second wireless network 1070 includes an MSC 1020, and services a wireless device 1090.

The MAST 200 provides presence and/or location information regarding any or all subscriber's of the first wireless network to external entities, without the need to change current communication standards, e.g., utilizing otherwise conventional SS7 and IS-41 communication messages.

The MAST 200 includes information similar to that contained in the SHLR, e.g., relating to the presence and/or location of serviced wireless devices. However, in accordance with the principles of the present invention, the MAST 200 may include additional information, and/or logged information over time with respect to each individual subscriber. The MAST 200 may be implemented on a same type platform as that implementing the SHLR 240, e.g., an SCP commercially available from LUCENT TECHNOLOGIES INC.

FIG. 5A shows a block diagram of the basic elements of an exemplary MAST system 200 shown in FIG. 5.

Importantly, the MAST 200 includes a TCP/IP interface 270 and internal module 201 allowing appropriate operational access to subscriber presence and/or location information maintained therein. Thus, any or all external application servers 290 (e.g., chat servers, law enforcement servers, etc.) may access subscriber presence and or location information regarding a wireless service provider's subscribers via the Internet 280.

The subscriber's presence and/or location information maintained in a subscriber presence/location database 205 may be pre-configured for transmission to various pre-set application servers 290 via the TCP/IP (i.e., non-SS7 protocol) module 201 and associated link 270. Alternatively, presence and/or location information regarding any or all subscriber's serviced by the MAST 200 may be provided to an application server 290 upon request by the application server 290.

Referring back to FIG. 5, the particular applications which can be implemented by the various application servers 290 is virtually limitless. Any application which can make use of the presence and/or location information regarding any or all wireless subscribers (regardless of whether or not they are inside or external to a particular wireless network) may utilize the information contained in the database of the MAST 200 in accordance with the principles of the present invention.

Figure 6:
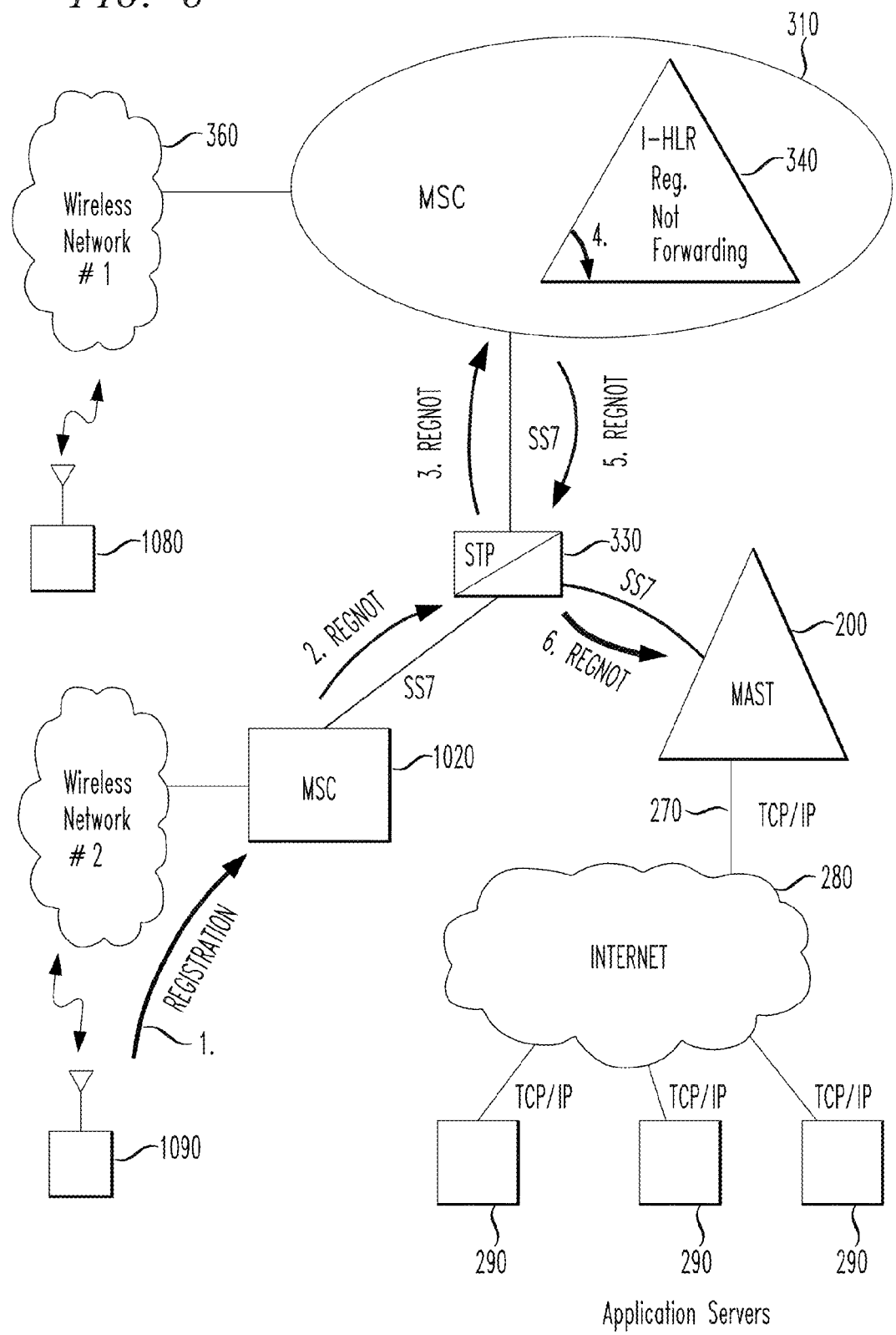
FIG. 6 is a detailed architecture and information flow of an embodiment of a MAST system corresponding to an integrated Home Location Register (I-HLR) including a registration notification forwarding mechanism integrated with a mobile switching center (MSC) on a common platform, utilizing message flows in conformance with SS7 standards and IS-41 standards, in accordance with the principles of the present invention.

The message flow shown in FIG. 5 relates to that of a stand-alone HLR 240. The message flow utilizing an integrated HLR is shown in FIG. 6. The message flow in FIG. 5 is as follows.

A MOBILE REGISTRATION message (1.) is transmitted by a relevant wireless device 1090 through the host wireless network #2 1070 to its MSC 1020. That MSC 1020 sends a MOBILE REGISTRATION NOTIFICATION (REGNOT) message (2.) to an STP 1030, which forwards a REGNOT message (3.) to the SHLR 240. Up to this point the message flow is as in the conventional system.

However, as shown in FIG. 5, the SHLR 240 implements a message referred to herein as a registration notification forwarding mechanism (4. in FIG. 5). The registration forwarding mechanism (4.) forwards a received REGNOT message (3.) back out to the STP 230 as a REGNOT message (5.), destined for the MAST 200.

The STP 230 forwards the REGNOT message (5.) from the SHLR to the MAST 200 using a REGNOT message (6.). Thus, the SHLR 240 shown in FIG. 5 is an otherwise conventional SHLR, but additionally includes the functions necessary to implement a registration notification forwarding mechanism to forward the REGNOT message (5.) to the MAST system 200 via the STP 230 using another forwarded REGNOT message (6.). With the architecture of the embodiment of FIG. 5, a service provider may need to upgrade software running on an associated SHLR 240, but need not upgrade their MSC 1010 or STP 230 from those otherwise conventionally available or already installed, providing significant cost savings and efficiency.

In response to the REGNOT message (6.) received from the STP 1030, the MAST 200 updates its database 205 appropriately. The information contained in the database 205 is then made available as appropriate over the TCP/IP link 270 to an external device, e.g., using an Intranet or the Internet 280, e.g., to all requesters, to only some requesters paying a particular fee for such a service, etc.

The service provider 250 is given operational and maintenance access to the MAST 200 similarly to conventional access given to an SHLR, e.g., using an X.25, RS-232 or TCP/IP link.

FIG. 6 is a detailed architecture and information flow of an embodiment of a MAST system 200 corresponding to an integrated Home Location Register (I-HLR) including a registration notification forwarding mechanism integrated with a mobile switching center (MSC) on a common platform, utilizing message flows in conformance with SS7 standards and IS-41 standards, in accordance with the principles of the present invention.

In particular, FIG. 6 shows that when using an I-HLR 340, the communications between the MSC/I-HLR common platform and the STP 330 are typically made over an SS7 link to the common platform, and that the elements on the common platform (e.g., the MSC 310 and the I-HLR 340) may communicate with one another in proprietary ways without the need to conform to SS7 or other external signaling requirements.

The I-HLR 340 shown in FIG. 6 is an otherwise conventional I-HLR, but additionally includes the functions necessary to implement a registration notification forwarding mechanism to forward the REGNOT message (5.) to the MAST system 200 via the STP 230 using another forwarded REGNOT message (6.). With the architecture of the embodiment of FIG. 6, a service provider may need to upgrade software running on an associated I-HLR 340, but need not upgrade their MSC 310 or STP 330 from those otherwise conventionally available or already installed.

Figure 7:
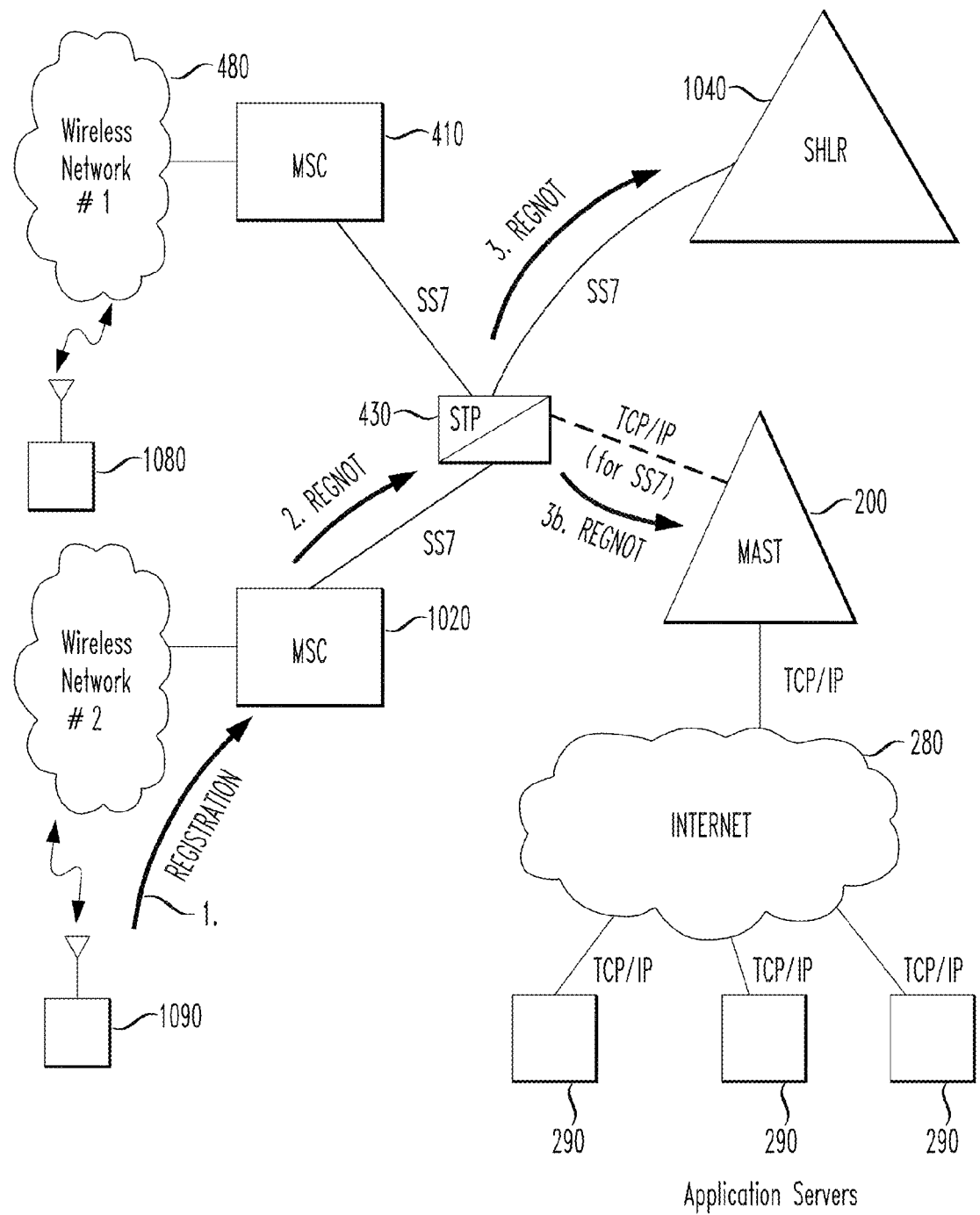
FIG. 7 is a detailed architecture and information flow of an embodiment of a MAST system corresponding to a stand-alone Home Location Register (SHLR) including a Registration Notification copy function in a signaling transfer point (STP) and a TCP/IP connection (or SS7 connection) to the MAST application, particularly useful in wireless networks having HLRs which do not include a registration notification forwarding mechanism, in accordance with the principles of the present invention.

FIG. 7 is a detailed architecture and information flow of an embodiment of a MAST system corresponding to a stand-alone Home Location Register (SHLR) including a Registration Notification copy function in a signaling transfer point (STP) and a TCP/IP connection (or SS7 connection) to the MAST application, particularly useful in wireless networks having HLRs which do not include a registration notification forwarding mechanism, in accordance with the principles of the present invention.

In particular, FIG. 7 importantly shows an STP 430 including otherwise conventional functions, but in addition includes a REGNOT copy and forward function.

The REGNOT copy and forward function in the STP 430 copies the REGNOT message (2.) received from an MSC 1020, and forwards a REGNOT copy message (3b.) to the MAST 200. The STP 430 also sends the otherwise conventional REGNOT message (3.) to the SHLR 1040.

The STP 430 shown in FIG. 7 is an otherwise conventional STP, but additionally includes the functions necessary to implement a COPY and FORWARD message to generate a copy of the REGNOT message (3.) sent to the SHLR 1040 as a copy REGNOT message (3b.) sent to the MAST 200. With the architecture of the embodiment of FIG. 7, a service provider may need to upgrade software running on an associated STP 430, but need not upgrade their MSC(s) 1010 or SHLR(s) 1040 from those otherwise conventionally available or already installed.

The MAST system architecture shown in FIG. 7 has the advantage of eliminating some communications (e.g., the registration notification forwarding mechanism trigger (4.) and the REGNOT message (5.) shown in FIG. 6), which is particularly important because the registration notification forwarding mechanism trigger (4.) is an enhanced proprietary feature (i.e., not standard) to some HLRs.

The service may be provided in a provisionless mode, and all the necessary subscriber information may reside on the HLR. Thus, there is preferably no specific subscriber provisioning necessary on the MAST SPA. Rather, the subscriber data may be maintained at the relevant HLR. The amount of memory, e.g., random access memory (RAM) and the number of SS7 links required by the SCP platform implementing the MAST SPA may be determined based on the subscriber count to be supported.

For instance, as a general guideline, consider the following example. Assuming a load of 500,000 subscribers, one (1) registration notification forwarding mechanism trigger per subscriber per hour, five (5) Mobile Inactivity Triggers (MITs) per subscriber per day, 1 KB of memory per subscriber, and an average SS7 message length of 100 octects, the number of SS7 links required in the disclosed embodiment for this configuration is approximately four (4), along with approximately 500 MB of RAM.

Use of Signaling Transfer Points (STPs) between MSCs can be implemented in multiple I-HLR environments as well.

From the perspective of a wireless service provider, MAST allows the implementation of an endless array of services and/or applications that can utilize presence and/or location information regarding a wireless device. Specific implementations of services will depend on the capabilities of the application servers that receive the information from the MAST. For instance, knowledge of registration activity in and of itself represents a huge benefit for the service provider from a marketing perspective because it can provide additional information regarding subscriber's habits, and general demographic data collection.

The MAST techniques and apparatus may also be used for law enforcement purposes. For instance, data relating to mobile station activity may be used, e.g., as evidence to build a legal case against an offender.

As another benefit, subscribers of a wireless service provider can be provided with an enhanced protection mechanism against fraud by allowing faster detection and/or tracking of delinquent mobile devices.

Depending upon particular parameters used, other services may be implemented. For instance, with knowledge of the location of a particular mobile station, a wireless service provider may implement an "Emergency Location" plan. Using such a service, mobile subscribers can have activity information (e.g., presence and/or location information, together with date and time) relating to the use of their mobile device transmitted to the MAST SPA in accordance with the principles of the present invention. The MAST SPA will log the presence and/or location information regarding relevant mobile subscribers served by the associated HRL, and pass the logged information on to any entity on the Internet or other entity or network, providing an accurate and up-to-date information source. Using the "Emergency Location" plan, the logged location information may be used by authorities to locate a person associated with that particular mobile device easier.

Figure 8A:
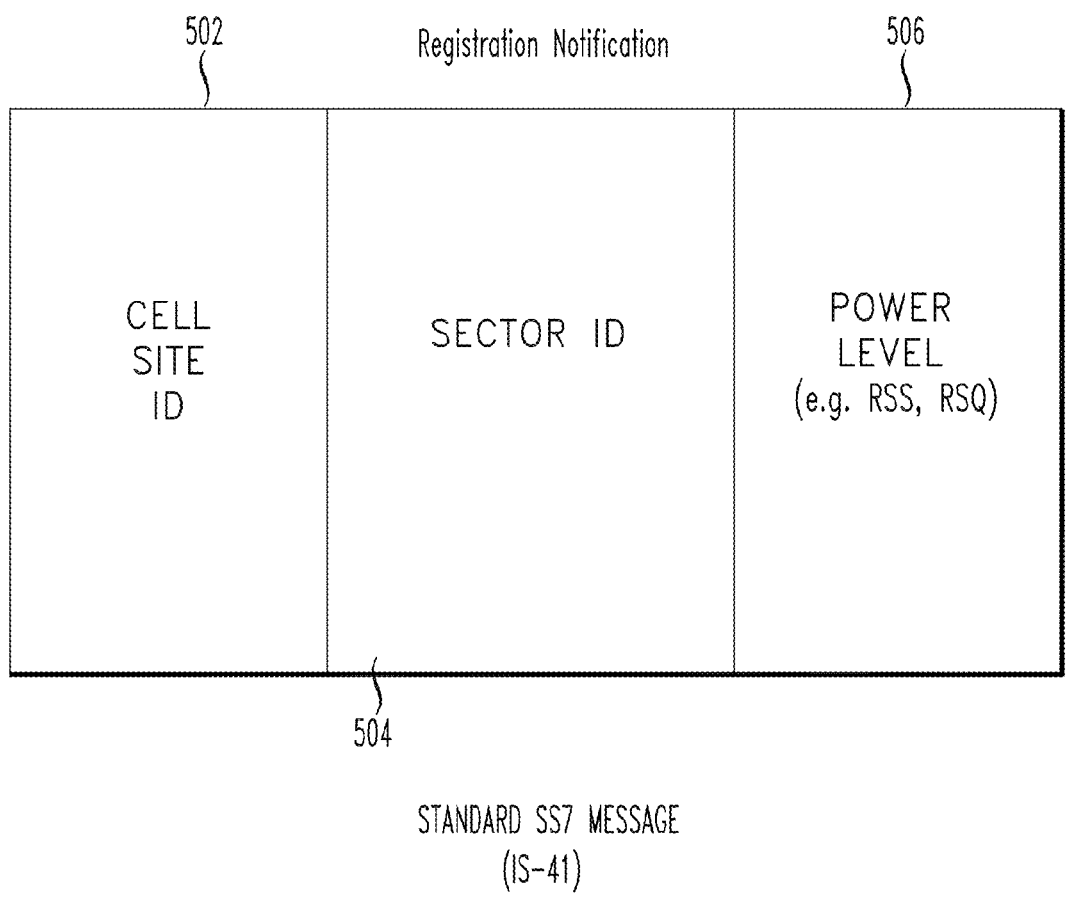
FIG. 8A is a simplified depiction of relevant parameters of a Mobile Registration Notification (REGNOT) message in conformance with SS7 and IS-41 standards utilized for determination of location information in a MAST system, in accordance with the principles of the present invention.

FIG. 8A is a simplified depiction of relevant parameters of a Mobile Registration Notification (REGNOT) message in conformance with SS7 and IS-41 standards utilized for determination of location information in a MAST system, in accordance with the principles of the present invention. FIG. 8B is a detailed depiction of all conventional parameters of a REGNOT message.

In particular, the REGNOT message parameters utilized by the MAST may be any or all parameters included or inferred from information within the standard REGNOT message shown in FIG. 8B. For instance, the cell site ID 502 and/or sector ID 504 of the cell servicing the relevant wireless device may be used to provide a location of the wireless device, and date and time of a communication may be used for presence information.

Other information such as power level 506 can be used to infer and further refine the location information. For instance, a lower power level received by the wireless device 1090 (and/or higher power output by the wireless device 1090) may be used to infer a longer distance from the relevant cell site receiving transmissions from the wireless device 1090. Conversely, a higher power level might infer that the wireless device 1090 is closer to the cell site. Thus, a sort of 'poor man's GPS' can be provided to external entities regarding the location of a subscriber's wireless device.

FIG. 9 is a simplified depiction of relevant parameters of a Mobile Subscriber Inactive message in conformance with SS7 and IS-41 standards utilized for determination of inactive presence information in a MAST system, in accordance with the principles of the present invention.

In particular, a MOBILE SUBSCRIBER INACTIVE message follows the same paths as does the REGNOT messages shown in FIGS. 5, 6 and 7. While the REGNOT message indicates an active wireless device, the receipt of a MOBILE SUBSRIBER INACTIVE message with respect to a particular subscriber may be logged in the database 205 of the MAST 200 as presence information, i.e., that the wireless device may no longer be present.

FIG. 10A is a simplified depiction of relevant parameters such as location in an exemplary Internet Protocol (IP) message sent from the MAST system to an application server (e.g., a Chat Server) via the Internet, in accordance with the principles of the present invention.

The particular information contained either in the database 205 of the MAST and/or which is transmitted over the TCP/IP connection 270 and the Internet 280 may depend upon the particular applications operating on any of the application servers 290. Rudimentary information may include, e.g., an IP address of the application server 290, an ID of the relevant mobile wireless device, presence information such as a date and time of activity, and location information either real or inferred. Real information may include the cell site ID and/or sector ID. Inferred or extrapolated information may include, e.g., a delta distance corresponding to a power level of the wireless device's transmitter during a last contact.

FIG. 10B is a simplified depiction of relevant parameters in another exemplary IP message such as a log of past presence and location information for a particular wireless device sent from the MAST system to an application server (e.g., a law enforcement authority) via the Internet, in accordance with the principles of the present invention.

For instance, as shown in FIG. 10B, presence and/or location information may be logged into a historical file for each subscriber/wireless device. A particular mobile ID together with a series of database entries corresponding to different REGNOT commands and/or MOBILE SUBSCRIBER INACTIVE messages received by the MAST can be provided to one or more particular application servers desiring such information.

Alternatively, the presence and/or location information transmitted to a desiring application server 190 may relate to a group of subscribers having a common attribute (e.g., most active subscribers, least active subscribers, subscribers living in a particular region, etc.).

As disclosed, activity status information is tracked by the MAST as follows. Initially, the MAST receives a Mobile Registration message via a registration notification forwarding mechanism, alternatively referred to as a Registration Forward Message, from the relevant MSC/HLR (I-HLR or S-HLR), and appropriately updates the activity status in the database. Upon power down of the relevant wireless device, the MAST will receive a Mobile De-Registration message via a Mobile Inactive Trigger (MIT) from the relevant MSC/HLR, and appropriately updates the activity status in the database.

When a new message (e.g., a mobile registration message or mobile de-registration message) is received, the MAST application preferably parses the message, e.g., into up to 10 parameters, and stores the parsed message portions in an appropriate MSID ordered table.

FIG. 11 shows an exemplary Mobile Station Identity (MSID) ordered table is shown in FIG. 11.

Figure 12:
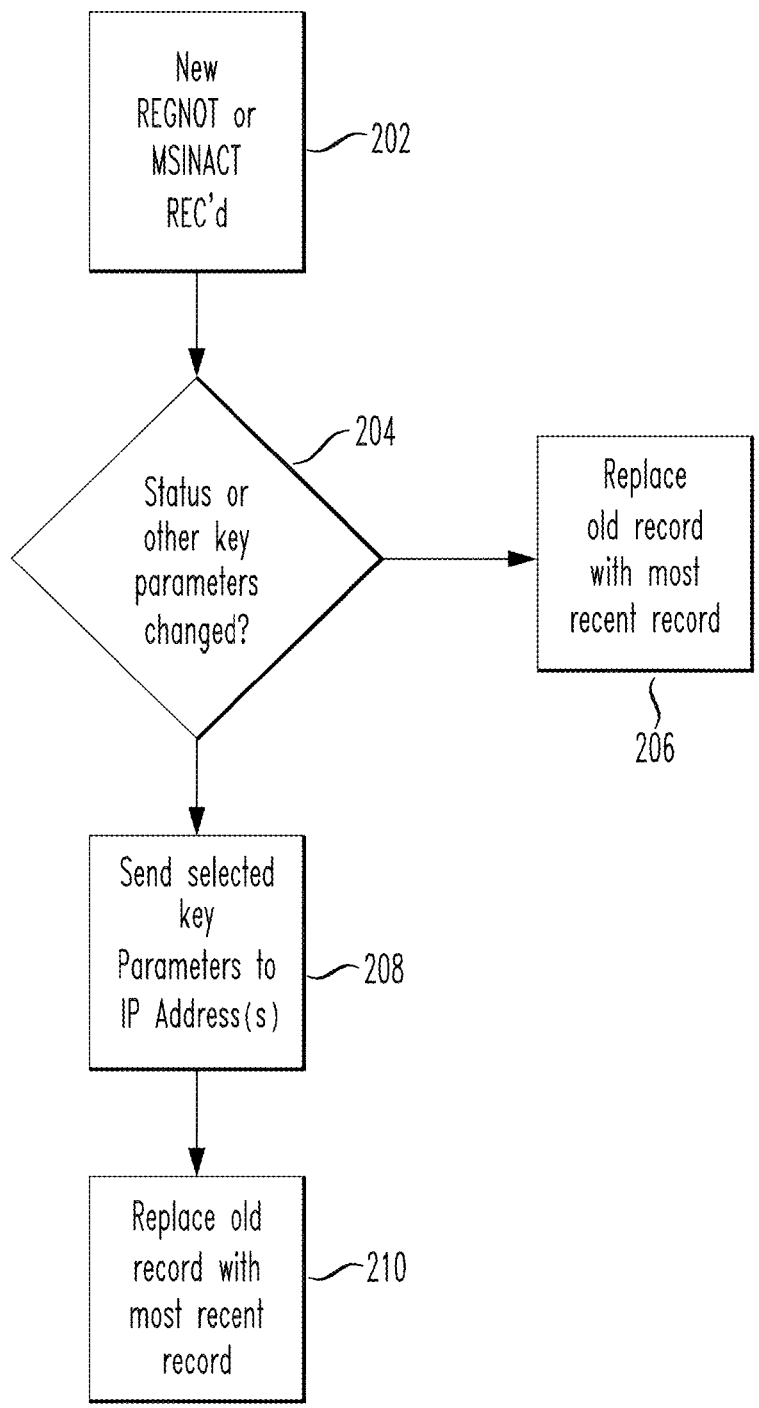
FIG. 12 shows an exemplary process by which the parsed message portions are processed.

FIG. 12 shows an exemplary process by which the parsed message portions are processed.

In particular, as shown in step 202 of FIG. 12, the process determines if a new REGNOT or MSINACT has been received.

If a record for the same MSID is found in the table of FIG. 11, in step 204 a comparison of the status and key parameters within the two records will be made.

In step 208, if the status (ACT to DEACT or DEACT TO ACT) or one of the key parameters are different from that of the previous record, a subset of key parameters up to and including all key parameters from this new record will be sent to at least one, but possibly multiple IP addresses on a network.

In steps 206 and 210, the old record is replaced in the MSID table with the new, most recent record.

The MAST receives information directly from the HLR or the STP (e.g., I-HLR or S-HLR), which has previously validated the MSID and determined the need to forward the information to the MAST.

Administration of the MAST may include, e.g., configuration and maintenance of the following:

Point-codes and Subsystem numbers of the I-HLRs that will send information to the MAST SPA.

Parameters that the I-HLR will forward to the MAST SPA in the registration notification forwarding mechanism and MIT messages.

Parameters that the MAST SPA will forward to the application servers.

Destination IP addresses and Port numbers of the application servers.

Expiration time for records that have not experienced changes over a configurable period of time.

Size of the rotating log file.

There is preferably only one record per MSID in the MAST. The relevant service provider is preferably given access to the database stored in the MAST, e.g., through the conventional operational maintenance processor (OMP).

Due to its nature, the content of this database is likely to change rapidly over time, therefore the MAST database may provide only a snapshot of the activity status of all the relevant wireless devices at any given time.

The MAST preferably keeps a temporary log of the messages sent to the application services in a rotating file. This rotating file may have a configurably fixed size, and may overwrite itself with more recent information, e.g., after a desired period of time determined by the level of message traffic. This log provides a historical representation of the activity of specific wireless devices, or groups of wireless devices.

Reports may be generated for the relevant service provider, e.g., through the OMP or via a TCP/IP connection to the Internet. Possible reports can include, e.g., various information depending upon the parameters that the relevant HLR sends to the MAST, and/or specific needs and selections made by the particular service provider.

In case the subscriber base increases, the platform can be easily scaled to increase capacity.

Being a Wireless Intelligent Network service, MAST takes advantage of the improved reliability, scalability and performance of the Advantage Platform and the flexibility of the intelligent network approach.

Additionally, MAST is an Intelligent Network application that can be executed simultaneously on a single SCP platform, such as a Short Message Service Center, Over The Air Activation, PrePaid Wireless, etc. This fact spreads the cost of the platform over several services, thus allowing the service provider to price them in a competitive way. From an operating standpoint, a single platform is easier to manage resulting in reduced maintenance costs.

Mobile Chat Location Register (MCLR)

The principles of the present invention may be used to implement a wireless chat tracking system (i.e., Mobile Chat Location Register (MCLR)) which utilizes a change in mobile registration status to automatically notify a chat group system outside the wireless network of current status information activity regarding a relevant device, e.g., registration activity or inactivity timeout.

In a disclosed embodiment, a registration notification (REGNOT) message is either explicitly forwarded or copied to an external IP based application (e.g., to a mobile chat group system). The change in mobile registration is communicated via a suitable signaling link (e.g., SS7, TCP/IP, etc.) between a Home Location Register (HLR) and the chat group system. Therefore, instead of a conventionally closed system using SS7 messages, REGNOT messages are pushed out over TCP/IP connections to external applications (e.g., chat servers) to automatically notify the external system of the location of a particular user.

In accordance with the principles of the present invention, a REGNOT message may be simply forwarded in accordance with instructions from an HLR, or all REGNOT messages received may be copied and forwarded to an external application, which then sifts through the copied and received REGNOT messages for messages of relevance to that particular external application.

Figure 13:
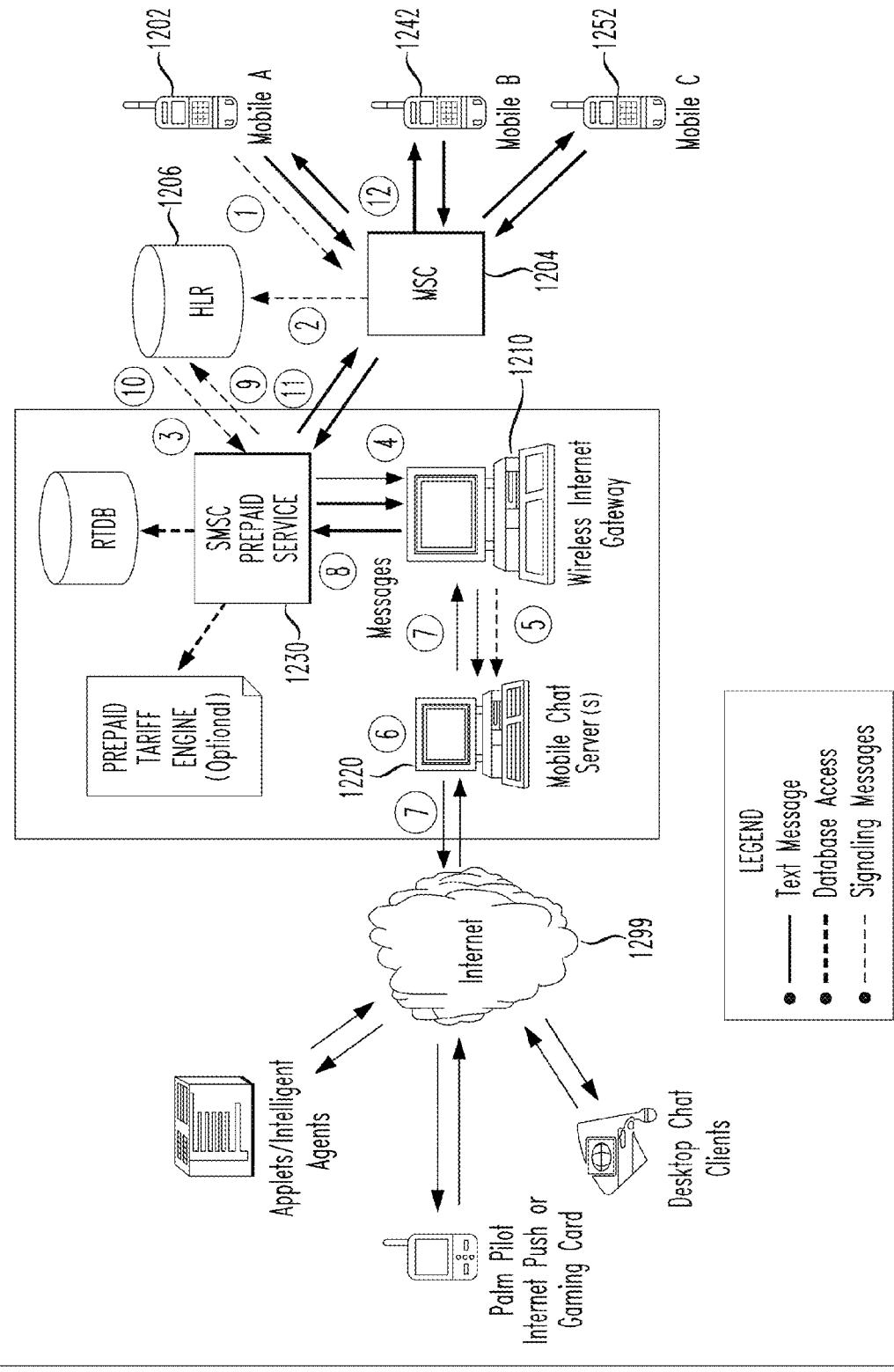
FIG. 13 shows an exemplary service implementation showing wireless chat status tracking providing an automatic on-line or off-line notification in a chat scenario using techniques and apparatus in accordance with the principles of the present invention.
Figure 14:
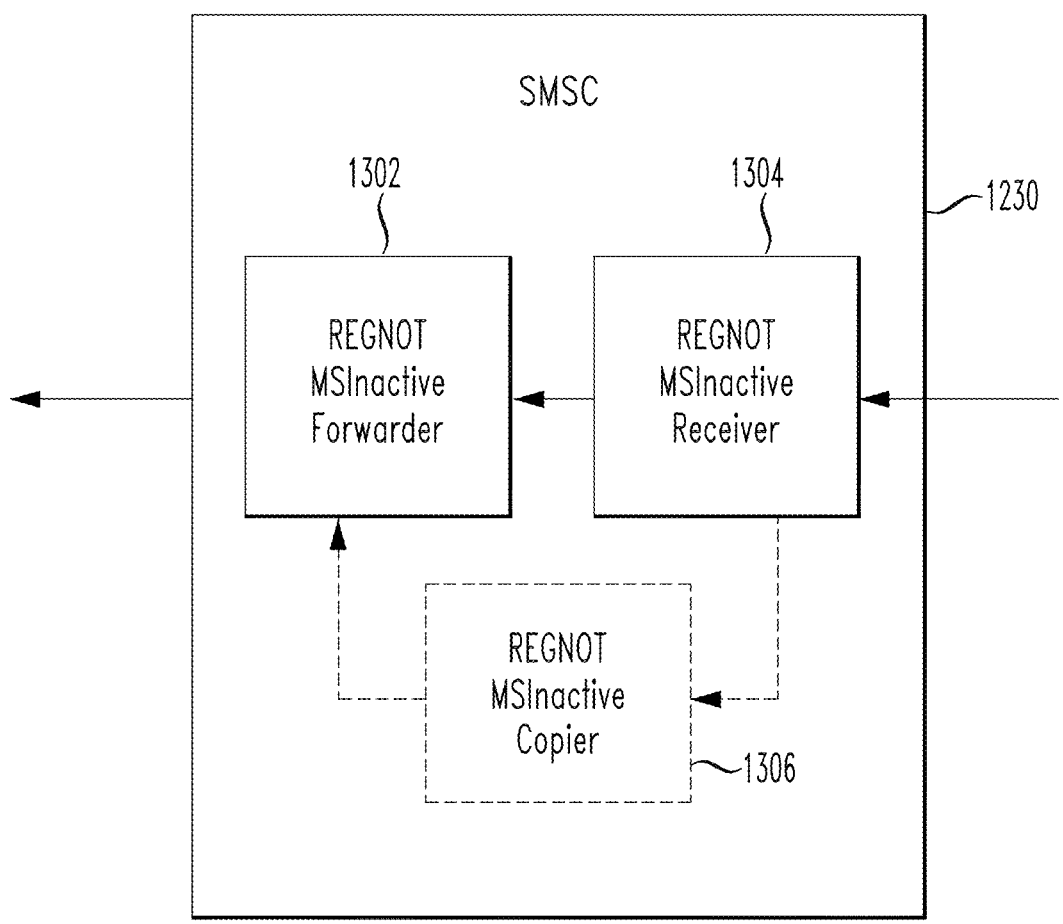
FIG. 14 shows a block diagram of the SMSC shown in FIG. 13, including a REGNOT/MSInactive message receiver, a REGNOT/MSInactive forwarder, and an optional REGNOT/MSInactive copier, in accordance with the principles of the present invention.

FIG. 13 shows an exemplary service implementation showing wireless chat status tracking providing an automatic on-line or off-line notification in a chat scenario using techniques and apparatus in accordance with the principles of the present invention. FIG. 14 shows a more detailed block diagram of the SMSC 1230 shown in FIG. 13, including a REGNOT message receiver 1304, a REGNOT forwarder 1302, and an optional REGNOT copier 1306.

For the purposes of illustration, assume that in FIGS. 13 and 14 all chat subscribers with the exception of Mobile A are already participating in a chat session called, e.g., "Buddies".

Scenario 1

Automatic on-Line Notification Chat Scenario in a Prepaid Environment (1) The handset Mobile A 1202, provisioned with chat service, is powered on or performs the IS-41 periodic or forced registration process. Thus, a Registration access message is sent from the Mobile A 1202 to the Mobile Switching Center (MSC) 1204.

(2) The MSC 1204 sends the IS-41 Registration Notification (REGNOT) message to the Home Location Register (HLR) 1206.

(3) Following the authentication process of Mobile A 1202, in accordance with the principles of the present invention, the HLR 1206 forwards the REGNOT message to, e.g., a relevant prepaid application server. This may be performed using an IS-41 REGNOT message over an SS7 network or an equivalent registration message over a TCP/IP network.

(4) The SMSC/Prepaid service 1230 may notify a suitable wireless Internet gateway 1210 that Mobile A 1202 is "on-line". Such a suitable wireless Internet gateway 1210 is shown and described in co-pending U.S. application Ser. No. 09/630,762, entitled "Wireless Internet Gateway" to Smith, filed Aug. 2, 2000.

If Mobile A 1202 is a prepaid subscriber, the prepaid service may verify an account balance for Mobile A 1202 at this point and can decide to continue service or not.

(5) The wireless Internet gateway 1210 forwards the REGNOT message to a relevant external chat server 1220 automatically indicating to that external application that Mobile A 1202 is "on-line".

(6) The external chat server 1220 determines that Mobile A 1202 belongs to a particular chat group, e.g., the chat group "Buddies" of the current example, and automatically registers Mobile A 1202 in the chat session.

(7) The external chat server 1220 notifies the other chat participants (e.g., the "Buddies" participants) that Mobile A 1202 is available by sending a broadcast text message to all current participants of that chat session. At the same time, the chat server 1220 may also notify Mobile A 1202 of all current participants of that chat session.

(8) The wireless Internet gateway 1210 automatically forwards chat messages from the chat server 1220 for delivery to the chat session participants via the relevant SMSC 1230.

(9) The short message service center (SMSC) 1230 requests the HLR 1206 for short message delivery to all participating mobile subscribers.

(10) The HLR 1206 provides the SMSC 1230 with all needed information to deliver the short messages.

(11) The SMSC 1230 stores and forwards the broadcast message to the MSC 1204 for delivery to the other chat participants (e.g., to Mobile B 1242 and Mobile C 1252), and the list of chat participants message to the automatically entering Mobile A 1202.

(12) The MSC 1204 delivers the chat messages to all participating mobiles 1202, 1242, 1252.

Scenario 2

Automatic Off-Line Notification Chat Scenario in a Prepaid Environment (1) The handset Mobile A 1202, provisioned with chat service, is powered off or has moved out of the relevant coverage area.

(2) The MSC 1204 detects an expiration of an inactivity timer and sends an IS-41 Inactivity message to the Home Location Register (HLR) 1206.

(3) The HLR 1206 forwards the Inactivity message, e.g., the IS-41 MS Inactivity message, over an SS7 network, or an equivalent inactivity message over a TCP/IP network to, e.g., a relevant prepaid application server such as the SMSC/Prepaid platform 1230.

(4) The SMSC/Prepaid service 1230 notifies the wireless Internet gateway 1210 that Mobile A 1202 is "off-line".

(5) The wireless Internet gateway 1210 forwards the message to the chat server 1220 that Mobile A 1202 is "off-line".

(6) The external chat server 1220 determines that Mobile A 1202 belongs to, e.g., the chat group "Buddies", and thus removes Mobile A 1202 from the chat session.

(7) The external chat server 1220 notifies the chat session participants, e.g., participants of the chat session "Buddies", that Mobile A 1202 has become unavailable, by sending a broadcast text message to all current chat participants.

(8) The wireless Internet gateway 1210 forwards the messages for delivery.

(9) The SMSC 1230 requests the HLR 1206 for short message delivery to all mobile subscribers.

(10) The HLR 1206 provides the SMSC 1230 with all needed information to deliver the messages.

(11) The SMSC 1230 stores and forwards the broadcast message for delivery to Mobile wireless devices B & C, 1242 & 1252.

The MSC 1204 delivers the messages to Mobile wireless devices B & C, 1242 & 1252.

Note that while the chat server 1220 shown in FIG. 13 is internal to the service provider's network, the principles of the present invention relate equally to placement of the chat server 1220 external to the service provider's network, i.e., over the Internet 1299.

This solution may be integrated with existing, commercially available SMSC & web gateway products that enable wireless carriers & Internet service providers (ISPs) to offer, e.g., a pre-payment billing option for enhanced messaging services.

The principles of the present invention have applicability for usage with wireless intelligent network (WIN) applications, e.g., those already otherwise containing SMSC, pre-paid, and/or web gateway applications. Moreover, there is applicability for usage with mobile registration, for inactivity message forwarding to a chat server, or for mobile automatic notification of subscriber status to chat server.

While the invention has been described with reference to the exemplary embodiments thereof, those skilled in the art will be able to make various modifications to the described embodiments of the invention without departing from the true spirit and scope of the invention.

What is claimed is:

1. A method of delivering packetized data to a wireless device, comprising:
    receiving, at a physical message distribution center, IP packetized data addressed to a recipient wireless device;
    requesting, by said physical message distribution center from an external physical mobile device registration server, a presence of said recipient wireless device determined based on a register which utilizes a change in mobile registration status; and
    routing said IP data to said recipient wireless device when said recipient wireless device is online, and leaving a relevant IP packetized data queue in said physical message distribution center unprocessed when said recipient wireless device is offline.

2. The method of delivering packetized data to a wireless device according to claim 1, wherein:
    said physical message distribution center communicates with said external physical mobile device registration server using Internet Protocol (IP).

3. The method of delivering packetized data to a wireless device according to claim 1, wherein said IP packetized data comprises:
    a short messaging system (SMS) text message.

4. The method of delivering packetized data to a wireless device according to claim 1, further comprising:
    routing said IP packetized data to said recipient wireless device via a destination wireless carrier using Short Message Peer-to-Peer (SMPP) protocol.

5. The method of delivering packetized data to a wireless device according to claim 1, further comprising:
    transmitting said IP packetized data to said recipient wireless device via a destination wireless carrier using Simple Mail Transfer Protocol (SMTP) protocol.

6. The method of delivering packetized data to a wireless device according to claim 1, further comprising:
    transmitting said IP packetized data to said recipient wireless device via a destination wireless carrier using Remote Method Invocation (RMI) protocol.

7. A method of delivering packetized data to a wireless device, comprising:
    receiving, at a physical message distribution center, IP packetized data addressed to a recipient wireless device;
    requesting, by said physical message distribution center from an external physical mobile device registration server, a presence of said recipient wireless device determined based on a register which utilizes a change in mobile registration status; and
    leaving a relevant IP packetized data queue in said physical message distribution center unprocessed when said recipient wireless device is offline, until said recipient wireless device is determined by said physical message distribution center, through communication with said external physical mobile device registration server, to be online.

8. The method of delivering packetized data to a wireless device according to claim 7, wherein:
    said physical message distribution center communicates with said external physical mobile device registration server using Internet Protocol (IP).

9. The method of delivering packetized data to a wireless device according to claim 7, wherein said IP packetized data comprises:
    a short messaging system (SMS) text message.

10. The method of delivering packetized data to a wireless device according to claim 7, further comprising:
    routing said IP packetized data to said recipient wireless device via a destination wireless carrier using Short Message Peer-to-Peer (SMPP) protocol.

11. The method of delivering packetized data to a wireless device according to claim 7, further comprising:
    transmitting said IP packetized data to said recipient wireless device via a destination wireless carrier using Simple Mail Transfer Protocol (SMTP) protocol.

12. The method of delivering packetized data to a wireless device according to claim 7, further comprising:
    transmitting said IP packetized data to said recipient wireless device via a destination wireless carrier using Remote Method Invocation (RMI) protocol.

13. Apparatus for delivering packetized data to a wireless device, comprising:
    means for receiving, at a physical message distribution center, IP packetized data addressed to a recipient wireless device;
    means for requesting, by said physical message distribution center from an external physical mobile device registration server, a presence of said recipient wireless device determined based on a register which utilizes a change in mobile registration status; and
    means for routing said IP data to said recipient wireless device when said recipient wireless device is online, and leaving a relevant IP packetized data queue in said physical message distribution center unprocessed when said recipient wireless device is offline.

14. The apparatus for delivering packetized data to a wireless device according to claim 13, wherein:
    said physical message distribution center communicates with said external physical mobile device registration server using Internet Protocol (IP).

15. The apparatus for delivering packetized data to a wireless device according to claim 13, wherein said IP packetized data comprises:
   a short messaging system (SMS) text message.

16. The apparatus for delivering packetized data to a wireless device according to claim 13, further comprising:
   means for routing said IP packetized data to said recipient wireless device via a destination wireless carrier using Short Message Peer-to-Peer (SMPP) protocol.

17. The apparatus for delivering packetized data to a wireless device according to claim 13, further comprising:
   means for transmitting said IP packetized data to said recipient wireless device via a destination wireless carrier using Simple Mail Transfer Protocol (SMTP) protocol.

18. The apparatus for delivering packetized data to a wireless device according to claim 13, further comprising:
   means for transmitting said IP packetized data to said recipient wireless device via a destination wireless carrier using Remote Method Invocation (RMI) protocol.

\* \* \* \* \*